US008345868B2

(12) United States Patent
Hirai et al.

(10) Patent No.: US 8,345,868 B2
(45) Date of Patent: Jan. 1, 2013

(54) DATA TRANSFER SYSTEM, DATA TRANSFER METHOD, DATA TRANSMISSION DEVICE AND DATA RECEIVING DEVICE

(75) Inventors: Tatsuya Hirai, Kanagawa (JP); Atsushi Saito, Kanagawa (JP)

(73) Assignee: HGST, Netherlands B.V., Amsterdam (NL)

( * ) Notice: Subject to any disclaimer, the term of this patent is extended or adjusted under 35 U.S.C. 154(b) by 514 days.

(21) Appl. No.: 12/613,459

(22) Filed: Nov. 5, 2009

(65) Prior Publication Data

US 2010/0111299 A1 May 6, 2010

(30) Foreign Application Priority Data

Nov. 5, 2008 (JP) ................................. 2008-284588

(51) Int. Cl.
*H04N 7/167* (2011.01)
(52) U.S. Cl. ...................................................... 380/201
(58) Field of Classification Search .................. None
See application file for complete search history.

(56) References Cited

U.S. PATENT DOCUMENTS

2001/0021075 A1 9/2001 Kitazaki et al.
2004/0123122 A1* 6/2004 Asai et al. ..................... 713/189

FOREIGN PATENT DOCUMENTS

JP 2007096817 4/2007

* cited by examiner

*Primary Examiner* — Brandon Hoffman

(57) ABSTRACT

A data transfer system. The data transfer system includes a first device and a second device. The first device is configured to encrypt a partial information group of the plurality of information groups and to transfer an encrypted information group to the second device, to generate an omission information group with information having a predetermined relation omitted from at least remaining information groups of the plurality of information groups, to encrypt and to transfer the omission information group to the second device, when a partial kind of information of the plurality of information groups has the predetermined relation. The second device is configured to decrypt the partial information group and the omission information group, to restore omitted information based on the omitted information having the predetermined relation included in a transferred partial information group, and to add the restored information to the transferred omission information group.

16 Claims, 15 Drawing Sheets

Usage Control Information

| Information | Abbreviation |
|---|---|
| Corresponding Service Type Specifier | CSTS |
| Usage Control Information Identifier | UCIID |
| Usage Rule enforced in Storage Security Manager (Ex. Allowed Copy Number, Allowed Playback Number) | $UR_S$ |
| Cipher Information (including Content Key) | CI |
| Usage Rule enforced in Playback Function Unit (Ex. Export Control Information) | $UR_P$ |
| Content Identifier | CID |
| Other Information | OI |

FIG. 5

IRCS Information

| Field# | Included Information | Abbreviation |
|---|---|---|
| 0 | Transfer Transaction Identifier | TTID |
| 1 | Retained Information Specifier | RIS |
| 2 | UCIID Increment Width Specifier | UCIIDIWS |
| 3 | CID Increment Width Specifier | CIDIWS |

FIG. 8

Structure of Retained Information Specifier

| Bit# | Included Information | Abbreviation |
|---|---|---|
| 0 | Corresponding Service Type Specifier | CSTS |
| 1 | Usage Control Information Identifier | UCIID |
| 2 | Usage Rule enforced in Storage Security Manager | $UR_S$ |
| 3 | Usage Rule enforced in Playback Function Unit | $UR_P$ |
| 4 | Content Identifier | CID |
| 5 | Other Information | OI |
| 6, 7 | Reserved | |

FIG. 9

UCISs Information

| Field# | Included Information | Abbreviation |
|---|---|---|
| 0 | Corresponding Service Type Specifier Coincidence | CSTSC |
| 1 | Usage Rule enforced in Storage Security Manager Coincidence | UR_SC |
| 2 | Usage Rule enforced in Playback Function Unit Coincidence | UR_PC |
| 3 | Status of $UCI_1$ | $UCIS_1$ |
| 4 | ... | ... |
| 5 | Status of $UCI_N$ | $UCIS_N$ |

FIG. 11

IOCS Information

| Field# | Included Information | Abbreviation |
|---|---|---|
| 0 | Output Information Specifier | OIS |
| 1 | Start UCIID | SUCIID |
| 2 | End UCIID | EUCIID |
| 3 | UCIID Increment Width Specifier | UCIIDIWS |
| 4 | Start CID | SCID |
| 5 | End CID | ECID |
| 6 | CID Increment Width Specifier | CIDIWS |

FIG. 12

DATA TRANSFER SYSTEM, DATA TRANSFER METHOD, DATA TRANSMISSION DEVICE AND DATA RECEIVING DEVICE

CROSS-REFERENCE TO RELATED APPLICATION

This application claims priority from the Japanese Patent Application No. 2008-284588, filed Nov. 5, 2008, the disclosure of which is incorporated herein in its entirety by reference.

TECHNICAL FIELD

Embodiments of the present invention relate to a data transfer system, a data transfer method, a data transmission device and a data receiving device.

BACKGROUND

Information for controlling the use of content data such as dynamic image data and music data, for example, the number of times of copying and the number of times of viewing such content data, are relevant to copyright protection. Normally, such information is transferred in an encrypted state between devices in order to prevent falsification. However, a performance issue for data-storage devices, such as hard-disk drives (HDDs), has arisen because the load of operations for encryption and decryption of content data and the transfer of content data has increased. This performance issue has gained increasing attention as encryption and decryption has become more advanced and rigorous. Thus, engineers engaged in advanced HDD design for audio-video recording (AVR) have become increasingly interested in enabling HDD technology to meet the demands of the marketplace for HDD AVR applications.

SUMMARY

Embodiments of the present invention include a data transfer system that is configured to transfer a plurality of information groups including a plurality of kinds of information corresponding to content data from a first device to a second device. The data transfer system includes a first device and a second device. The first device is configured to encrypt a partial information group of the plurality of information groups and to transfer an encrypted information group to the second device, to generate an omission information group with information having a predetermined relation omitted from at least remaining information groups of the plurality of information groups, to encrypt and to transfer the omission information group to the second device, when a partial kind of information of the plurality of information groups has the predetermined relation. The second device is configured to decrypt the partial information group and the omission information group, to restore omitted information based on the omitted information having the predetermined relation included in a transferred partial information group, and to add the restored information to the transferred omission information group.

DESCRIPTION OF THE DRAWINGS

The accompanying drawings, which are incorporated in and form a part of this specification, illustrate embodiments of the invention and, together with the description, serve to explain the embodiments of the present invention:

FIG. 5 is a table showing example contents of usage control information, in accordance with an embodiment of the present invention.

FIG. 8 is a table showing example contents of an information retention control specifier, in accordance with an embodiment of the present invention.

FIG. 9 is a table showing example contents of a retained information specifier, in accordance with an embodiment of the present invention.

FIG. 11 is a table showing example contents of usage control information storage status, in accordance with an embodiment of the present invention.

FIG. 12 is a table showing example contents of an information output control specifier, in accordance with an embodiment of the present invention.

Figure 1:
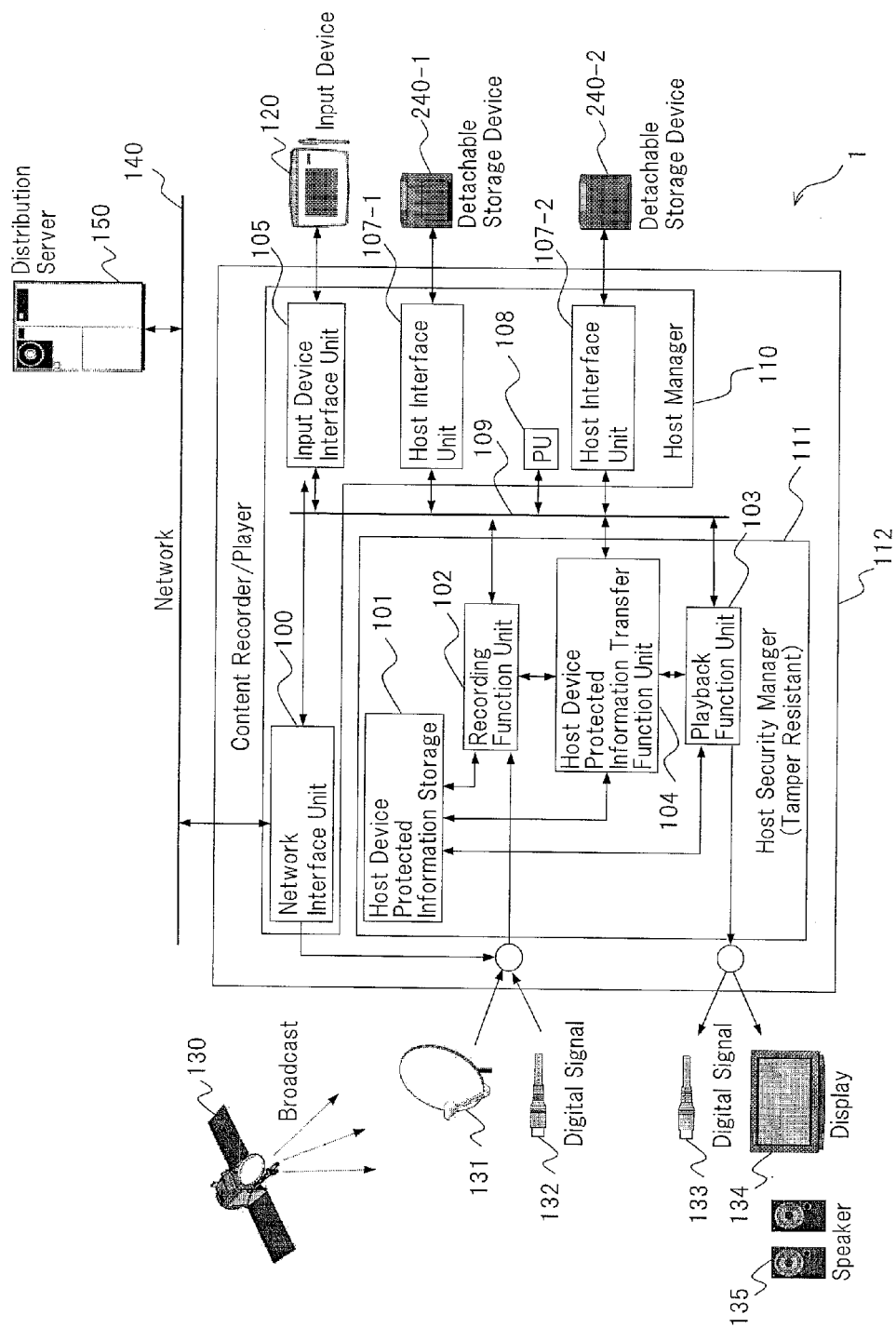
FIG. 1 is a block diagram showing an example configuration of a data transfer system, in accordance with an embodiment of the present invention.

The drawings referred to in this description are to not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it is to be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of description if not necessary.

Description of Embodiments of the Present Invention for a Data Transfer System, a Data Transfer Method, a Data Transmission Device and a Data Receiving Device To address the above-described issues, embodiments of the present invention provide a data transfer system, a data transfer method, a data transmission device and a data receiving device which enable reduction in the load of operations for encryption and decryption and transfer of information corresponding to the use of content data. In accordance with embodiments of the present invention, a data transfer system is provided that is configured to transfer, or alternatively, transfers, a plurality of information groups including a plurality of kinds of information corresponding to content data from a first device to a second device. In accordance with an embodiment of the present invention, when a partial kind of the information of the plurality of information groups has a predetermined relation, the first device is configured to encrypt, or alternatively, encrypts, a partial information group of the plurality of information groups and is configured to transfer, or alternatively, transfers, the encrypted information group to the second device. In accordance with embodiments of the present invention, the first device is further configured to generate, or alternatively, generates, an omission information group with information having the predetermined relation omitted from at least remaining information groups of the plurality of information groups, and is configured to encrypt and to transfer, or alternatively, encrypts and transfers, the omission information group to the second device. In addition, in accordance with embodiments of the present invention, the second device is configured to decrypt the partial information group and the omission information group, and is configured restore, or alternatively, restores, the omitted information based on the information having the predetermined relation included in the transferred partial information group and is configured to add, or alternatively, adds, the restored information to the transferred omission information group.

In one embodiment of the present invention, each of the information having the predetermined relation represents the same content, and the second device is configured to add, or alternatively, adds, the same information as the information having the predetermined relation included in the transferred partial information group to the omission information group.

Moreover, in another embodiment of the present invention, the information having the predetermined relation represents a variable that changes according to a predetermined rule, and the second device is configured to restore, or alternatively, restores, the omitted information based on the variable represented by the information having the predetermined relation included in the transferred partial information group and the predetermined rule.

In another embodiment of the present invention, the first device is configured to transfer, or alternatively, transfers, the first information group of the plurality of information groups to the second device, is configured to generate, or alternatively, generates, the omission information group with respect to the subsequent information groups and is configured to transfer, or alternatively, transfers, the omission information group to the second device. In this embodiment of the present invention, the first device is further configured to transfer collectively, or alternatively, may collectively transfer, the plurality of omission information groups to the second device.

Also, in another embodiment of the present invention, the first device is configured to notify, or alternatively, notifies, the second device of the kind of the omitted information. In this embodiment of the present invention, the second device is further configured to stop transfer, or alternatively, may stop transfer, when the kind of the information omitted in the transferred omission information groups is different from the kind of which second device is notified. Moreover, in the preceding embodiment of the present invention, the second device is further configured to notify, or alternatively, may notify, the first device of the kind that is different.

In another embodiment of the present invention, the plurality of information groups that is to be transferred from the second device and the kind of the information that is to be omitted in the plurality of information groups from the second device are designated to the first device. In this embodiment of the present invention, the first device may further include a temporary storage unit that is configured to store temporarily, or alternatively, temporarily stores, the plurality of information groups that are to be transferred, and the first device is configured to stop transfer, or alternatively, may stop transfer, when the kind of the information having the predetermined relation in the plurality of information groups stored in the temporary storage unit is different from the designated kind. In the preceding embodiment of the present invention, the first device is configured to notify, or alternatively, may notify, the second device of the kind that is different.

In another embodiment of the present invention, the first device is configured to generate, or alternatively, generates, the omission information group from all the plurality of information groups.

Furthermore, in yet another embodiment of the present invention, the first device is configured to add, or alternatively, adds, a keyed hash value of the partial information group to the partial information group, and the second device is configured to confirm, or alternatively, confirms, validity of the partial information group based on the keyed hash value.

Moreover, in accordance with embodiments of the present invention, a data transfer method is provided for transferring a plurality of information groups including a plurality of kinds of information corresponding to content data from a first device to a second device. In accordance with embodiments of the present invention, the data transfer method includes, with the first device, when a partial kind of the information of the plurality of information groups has a predetermined relation: encrypting and transferring a partial information group of the plurality of information groups to the second device; generating an omission information group with the information having the predetermined relation omitted from at least the remaining information groups of the plurality of information groups; and, encrypting and transferring the omission information group to the second device. In accordance with embodiments of the present invention, the data transfer method further includes, with the second device: decrypting the partial information group and the omission information group; and, restoring the omitted information based on the information having the predetermined relation included in the transferred partial information group and adding the restored omitted information to the transferred omission information group.

Also, in accordance with embodiments of the present invention, a data transmission device is provided that is configured to transmit, or alternatively, transmits, a plurality of information groups including a plurality of kinds of information corresponding to content data to a data receiving device. In accordance with embodiments of the present invention, the data transmission device includes: an encryptor that is configured to encrypt, or alternatively, encrypts, a partial information group of the plurality of information groups and a transmitter that is configured to transfer, or alternatively, transfers, the encrypted information group to the data receiving device, when a partial kind of the information of the plurality of information groups has a predetermined relation; and, a generator that is configured to generate, or alternatively, generates an omission information group with the information having the predetermined relation omitted from at least the remaining information groups of the plurality of information groups. In accordance with embodiments of the present invention, the encryptor is configured to encrypt, or alternatively, encrypts the omission information group; and, the transmitter is configured to transfer, or alternatively, transfers, the omission information group to the data receiving device.

In addition, in accordance with embodiments of the present invention, a data receiving device is provided that is configured to receive, or alternatively, receives, a plurality of information groups including a plurality of kinds of information corresponding to content data from the data transmission device. In accordance with embodiments of the present invention, the data receiving device includes a receiver that is configured to receive, or alternatively, receives, a partial information group of the plurality of information groups and an omission information group with the information having the predetermined relation omitted from at least the remaining information groups of the plurality of information groups, in an encrypted state from the data transmission device, when a partial kind of the information of the plurality of information groups has a predetermined relation. In accordance with embodiments of the present invention, the data receiving device further includes a decryptor that is configured to decrypt, or alternatively, decrypts, the partial information group and the omission information group; and, a restorer that is configured to restore, or alternatively, restores, the omitted information based on the information having the predetermined relation included in the transferred partial information group and is configured to add, or alternatively, adds, the restored information to the transferred omission information group.

As described herein, embodiments of the present invention include a data transfer system including a first device, which may be a data transmission device, and a second device, which may be a data receiving device, that may be implemented in hardware, firmware, hardware and software, firmware and software, and hardware, firmware and software, excluding implementation in purely software alone. As described herein, embodiments of the present invention include a data transmission device including an encryptor, a transmitter and a generator that may be implemented in hardware, firmware, hardware and software, firmware and software, and hardware, firmware and software, excluding implementation in purely software alone. As described herein, embodiments of the present invention include a data receiving device including a receiver, a decryptor and a restorer that may be implemented in hardware, firmware, hardware and software, firmware and software, and hardware, firmware and software, excluding implementation in purely software alone. Although embodiments of the present invention including the data transfer system, the data transmission device and the data receiving device may be described in terms of implementations including machine operations, such implementations are not to be construed as purely software, but are implementations in hardware, firmware, hardware and software, firmware and software, and hardware, firmware and software, excluding implementation in purely software alone. Moreover, as described herein, embodiments of the present invention include a computer-readable medium, or alternatively, media, including the above and subsequently described machine operations for performing a data transfer method. As described herein, a machine operation may include within the scope of its meaning a computer-executable instruction; and, a computer-readable medium includes, by way of example without limitation thereto, any device selected from the group of devices consisting of a hard-disk drive, a floppy-disk drive, a magnetic-storage tape, a random access memory (RAM), an electrically alterable and programmable read only memory (EPROM), and similar information-storage devices.

In accordance with embodiments of the present invention, as the omission information group is generated, the volume of information is reduced; and, therefore, the load of operations for encryption, decryption and transfer may be reduced.

With reference now to FIG. 1, in accordance with embodiments of the present invention, a block diagram is shown that illustrates the configuration of a data transfer system. A data transfer system 1 includes a content recorder/player, hereinafter referred to as host device 112, and plurality of detachable storage devices, hereinafter referred to as storage devices 240, connected to the host device. These host device 112 and storage devices 240 mutually transfer content data such as dynamic image data and music data, and usage control information, which is subsequently described in detail, corresponding to such content data.

Here, in the case where the host device 112 transmits data and the storage device 240 receives this data, the host device 112 is equivalent to the first device, which may be a data transmission device, and the storage devices 240 are equivalent to the second device, which may be a data receiving device. On the other hand, in the case where the storage device 240 transmits data and the host device 112 receives this, the storage devices 240 are equivalent to the first device, which may be the data transmission device, and the host device 112 is equivalent to the second device, which may be the data receiving device.

The host device 112 mainly includes a host manager 110 and a host security manager 111. The host manager 110 and the host security manager 111 are connected to each other via an internal bus 109.

Of the host manager 110 and the host security manager 111, the host manager 110 includes a network interface unit 100 for connecting to a network 140, an input device interface unit 105 for connecting to an input device 120, a plurality of host interface units 107 for connecting the storage devices 240, and a processor unit (PU) 108, which comprehensively controls the operation of each configuration in the device.

The host security manager 111 includes a host device protected information storage 101, a recording function unit 102, a playback function unit 103, and a host device protected information transfer function unit 104. The host device protected information storage 101, the recording function unit 102, the playback function unit 103, and the host device protected information transfer function unit 104 may be configured by hardware, or alternatively, may be configured by software.

Content data distributed from a broadcast wave distribution source 130, a distribution server 150 or similar source is acquired by the host device 112 via a broadcast wave receiving antenna 131, a digital signal terminal 132, the network 140 and similar means. Such content data is encrypted by a predetermined encryption system at the broadcast wave distribution source 130, or alternatively, the distribution server 150. Also, usage control information including key data for decrypting the encrypted content data corresponds to the content data; and, this usage control information is acquired together with the content data by the host device 112. This usage control information may be acquired from the same distribution source as the content data, or alternatively, may be acquired from a different distribution source.

The content data and the usage control information thus acquired are stored in the storage devices 240 connected to the host device 112 by the operation of the recording function unit 102 and the host device protected information transfer function unit 104.

Also, the content data and the usage control information stored in the storage devices 240 are decrypted and played back by the operation of the playback function unit 103 and the host device protected information transfer function unit 104. The content data thus played back is outputted to a digital signal terminal 133, a display 134, speakers 135 and similar receiving devices.

Here, the host security manager 111 is configured as a tamper-resistant block which prevents unauthorized acquisition of key data included in the usage control information, as well as unauthorized duplication and falsification of the usage control information. Specifically, the host device protected information transfer function unit 104 included in this host security manager 111 executes transfer of data that needs protection, such as a necessary certificate in authentication with the storage devices 240, information of an expired certificate, and key data and usage control information for encryption. Also, in the host device protected information storage 101, data that needs protection is stored such as: a necessary certificate in authentication with the storage devices 240, information of an expired certificate, and a progress log of authentication and transfer of the usage control information.

Figure 2:
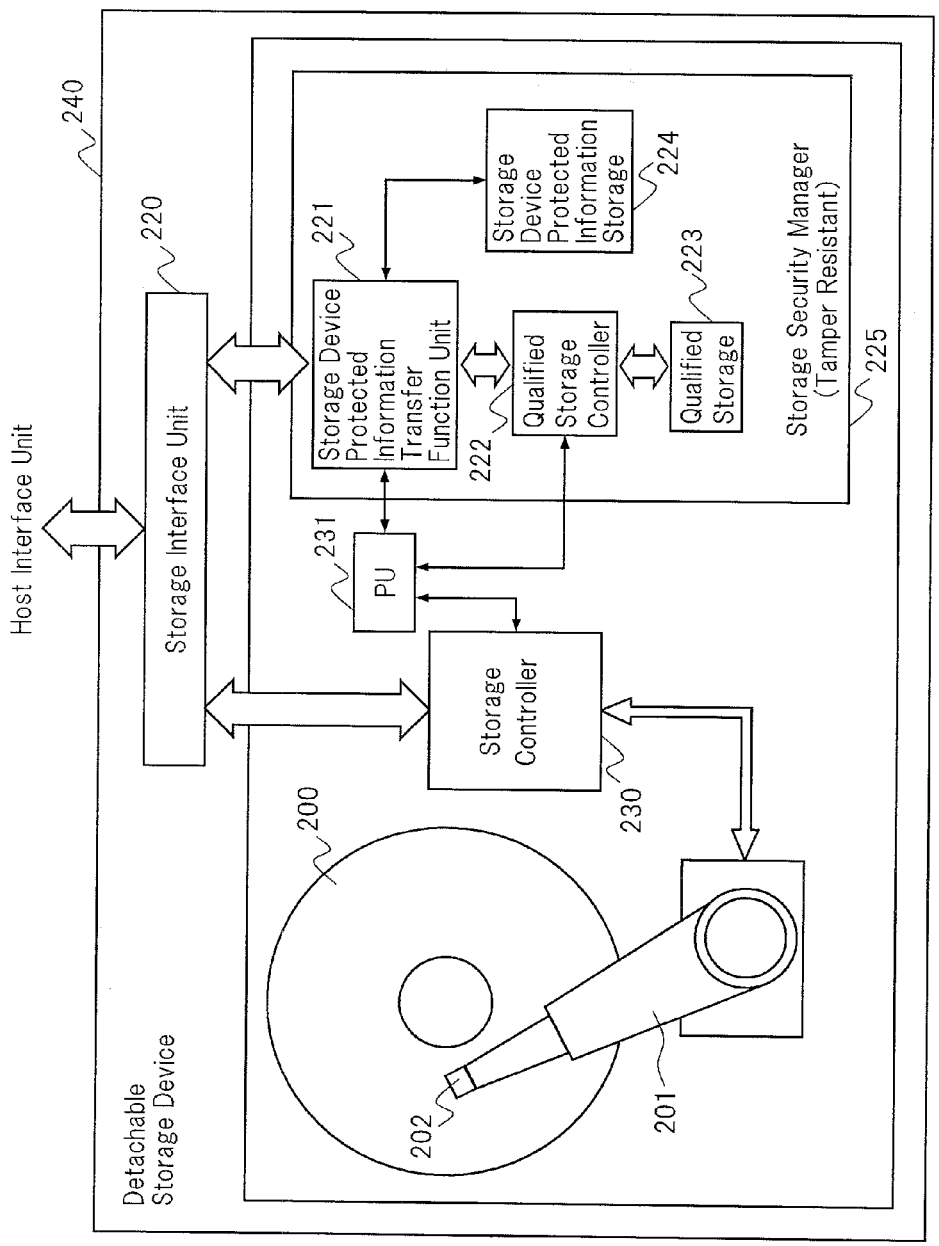
FIG. 2 is a block diagram showing an example configuration of a detachable storage device, in accordance with an embodiment of the present invention.

With reference now to FIG. 2, in accordance with an embodiment of the present invention, a block diagram is shown that illustrates an example configuration of the storage device 240. The storage device 240 is configured as a hard-disk drive (HDD) which reads and writes data in response to a request from the host device 112. The storage device 240 includes a magnetic-recording disk 200, a magnetic-recording head 202, which reads and writes data, an arm 201 supporting this magnetic-recording head 202, a storage controller 230, a processor unit (PU) 231, which control these parts, and a storage interface unit 220, and similar HDD components.

Encrypted content data transferred from the host device 112 is recorded to this magnetic-recording disk 200. However, data may be read from and written to this magnetic-recording disk 200 without having any limitation of the kind from the host device.

Moreover, the storage device 240 includes a storage security manager 225 as a configuration corresponding to the host security manager 111.

This storage security manager 225 includes: a storage device protected information transfer function unit 221, a qualified storage controller (QSC) 222, a qualified storage (QS) 223, and a storage device protected information storage (QS) 224. These may be configured by hardware, or alternatively, may be configured by software.

These storage device protected information transfer function unit 221 and storage device protected information storage 224 carry out operations similar to that of the above-described host device protected information transfer function unit 104 and host device protected information storage 101. Also, the qualified storage controller 222 carries out operations such as recording usage control information to the qualified storage 223 and reading usage control information from the qualified storage 223.

The storage device 240 is configured as a HDD, by way of example without limitation thereto, as the storage device 240 may be other devices having a data-storage function including the storage security manager 225, such as, for example, a semiconductor memory device.

Meanwhile, in FIG. 1 as described above, an example is shown in which the host security manager 111 and the storage security manager 225 are closely connected to each other. However, instead of being limited to this, connection modes shown in FIG. 3 and FIG. 4 may also be employed, as is next described.

Figure 3:
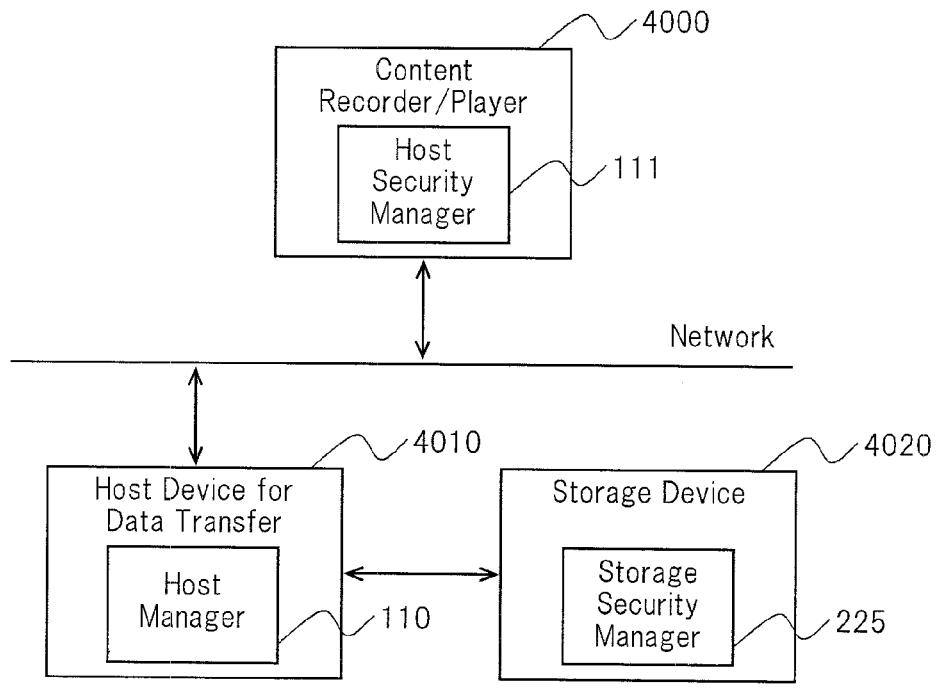
FIG. 3 is a block diagram showing an example modification of the data transfer system, in accordance with an embodiment of the present invention.

With reference now to FIG. 3, in accordance with embodiments of the present invention, a mode may be employed in which a content recorder/player 4000 having the host security manager 111 and a host device for data transfer 4010 having the host manager 110 are connected via a network and in which a storage device 4020 having the storage security manager 225 is connected to this host device for data transfer 4010. In this case, data reading from, and data writing to, the storage device 4020 is mainly carried out by the host manager 110 of the host device for data transfer 4010. However, authentication and transfer of usage control information are carried out between the host security manager 111 of the content recorder/player 4000 and the storage security manager 225 of the storage device 4020.

Figure 4:
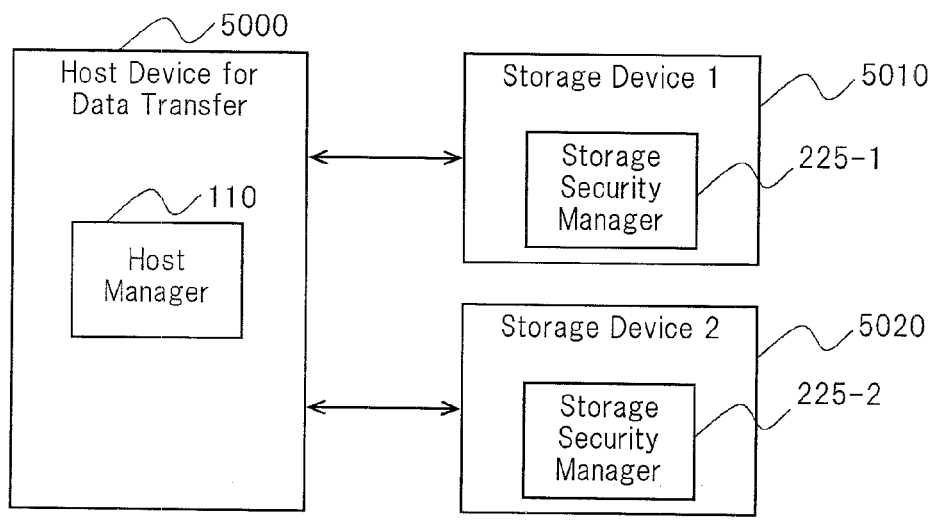
FIG. 4 is a block diagram showing an example modification of the data transfer system, in accordance with an embodiment of the present invention.

Alternatively, with reference now to FIG. 4, in accordance with an embodiment of the present invention, a mode may be employed in which two storage devices 5010 and 5020 each having a respective storage security manager 225-1 and 225-2 are connected to a host device for data transfer 5000 having the host manager 110. In this case, data transfer between the two storage devices 5010 and 5020 is carried out mainly by the host manager 110 and authentication; and, transfer of usage control information are carried out between the two storage security managers 225-1 and 225-2. Usage control information transferred between the host device 112 and the storage device 240 is next described.

With reference now to FIG. 5, in accordance with embodiments of the present invention, a table is shown that illustrates example contents of usage control information. Usage control information (UCI) is an information group including a plurality of kinds of information relating to usage control of content data and corresponds to the content data.

A corresponding service type specifier (CSTS) indicates the service to which content data, for example, dynamic images, music and similar content data, to which this usage control information UCI corresponds, belongs.

A usage control information identifier (UCIID) is an identifier (ID) allocated to this usage control information UCI.

A usage rule enforced in storage security manager ($UR_S$) indicates a rule in limiting the usage of the content data to which this usage control information UCI corresponds, on the side of the storage security manager 225. As such a rule, for example, the number of permitted times of copying, viewing or similar rule may be considered. If this is not satisfied, the output of the usage control information UCI from the storage security manager 225 is limited.

Cipher information (CI) is information including key data and an encryption-related operation parameter for decrypting the content data corresponding to this usage control information UCI.

A usage rule enforced in playback function unit ($UR_P$) indicates a rule in limiting the usage of the content data to which this usage control information UCI corresponds, on the side of the host security manager 111. As such a rule, for example, information specifying a connection counterpart device where output is available, a viewing availability period and similar rules may be considered; however, these rules may not duplicate the above $UR_S$. If this is not met, the decryption of the content data is limited at the host security manager 111.

A content identifier (CID) is an identifier (ID) of the content data corresponding to this usage control information UCI.

Other information (OI) is information that is not directly related to the usage control of the content data.

A data transfer method according to an embodiment of the invention, which is realized between the host device 112 and the storage device 240, is next described with reference to FIGS. 6 through 14. In FIGS. 6 through 14, operations carried out by the host security manager 111 and the storage security manager 225 are mainly shown.

About Encryption

Before the specific description of the data transfer method of embodiments of the present invention, first, encryption used in embodiments of the present invention are next described. In accordance with embodiments of the present invention, key data for asymmetric encryption and key data for symmetric encryption are used. Of these, two kinds of key data for asymmetric encryption are called public key and private key, and the key data for symmetric encryption is called common key.

In the following description, a public key is referred to as $Kpu_{Exposition[Device]}$ and a private key is referred to as $Kpr_{Exposition[Device]}$. Here, the term in the square brackets "Device" represents a device having its public key or private key. If the term in the square brackets is H for "Host," the term represents the host device 112. If the term is S for "Storage," the term represents the storage device 240. Also, the subscript character string "Exposition" represents a character string for explaining the identity of the public key or private key. For example, $Kpr_{CA}$ refers to a private key that is grasped and managed only by a certificate authority that issues a certificate. $Kpr_{CA}$ is normally used in calculating a digital signature included in a certificate issued. $Kpu_{CA}$ is a public key corresponding to this $Kpr_{CA}$. $Kpu_{CA}$ and $Kpr_{CA}$ are used for verification of the digital signature included in the certificate. Similarly, $Kpu_{CR}$ refers to a public key included in each certificate; and, $Kpr_{CR}$ refers to a private key corresponding to this $Kpu_{CR}$. In view of the above, a certificate including $Kpu_{CR[Device]}$ and including a digital signature calculated with $Kpr_{CA}$ is described as: $C(Kpr_{CA}, Kpu_{CR[Device]})$.

Also, common keys are referred to as $Kch_{[Device]}$, $Ks_{S[Device]Order}$. Here, the common key with the subscript letters "ch" attached thereto is called challenge key. This is a common key that is temporarily generated in the process of exchanging the certificate. On the other hand, the common key with the subscript letter "s" attached thereto is called session key. This is used, in transferring usage control information, for encrypting this usage control information at a transfer source device and for decryption at a transfer destination device. Since a new session key is generated every time transfer of usage control information is carried out, the generating order is expressed by the letter "Order" following the square brackets.

Moreover, an operation to encrypt data Y with such key data X is expressed as E(X,Y). Similarly, an operation to decrypt data Y with key data X is expressed as D(X,Y). Also, an operation to find a hash value of data X is expressed as H(X) and an operation to concatenate data X and data Y is expressed as X||Y.

Next, an operation method of asymmetric encryption will be supplemented. In this embodiment, encryption with the public key Kpu is carried out several times in the process of authentication. In the authentication, one key data is secretly shared with the generally known Diffie-Hellman method (DH method), and target message data is symmetrically encrypted with this key data. As an asymmetric encryption algorithm, any algorithm may be used.

As examples, a key data sharing method with the original DH method based on exponentiation and a key data sharing method based on addition on an elliptic curve are subsequently described. To share key data between two parties based on the original DH method based on exponentiation, first, a certain value G needs to be shared between the two in advance. For convenience of description, these two are described as a device 1 and a device 2. In addition, this value G may be opened in public. Next, the device 1 generates one natural number, a, with a predetermined length and secretly holds the natural number, a. Next, the device 1 raises the shared G to the power of a and transmits the resulting numeric value G^a, where "A" represents exponentiation, to the device 2. The device 2 generates one natural number, b, and secretly holds the natural number, b, in similar fashion to device 1. Then, as device 2 receives G^a, device 2 further raises this value to the power of b to acquire (G^a)^b. Meanwhile, device 2 transmits the result of raising G to the power of b, that is, G^b, to device 1. As device 1 receives G^b, device 1 further raises this value to the power of a to acquire (G^b)^a. By the foregoing operation, (G^b)^a=(G^a)^b is secretly shared between device 1 and device 2.

Thus, if a and b are designated as private keys Kbr1 and Kbr2 of device 1 and device 2, respectively, and G^a and G^b are designated as public keys Kpu1 and Kpu2 of device 1 and device 2, respectively, encryption E(Kpu1,M) of certain message data M with the public key Kpu1 based on the DH method is actually to find E((G^a)^b,M) with (G^a)^b as key data for symmetric encryption, then concatenate Kpu2 to this value to generate E((G^a)^b,M)||Kpu2. Arithmetically, a, b, G^a and G^b may be dynamically generated many times, or alternatively, may be permanently recorded in each device.

The key data sharing method based on addition on an elliptic curve is substantially the same as the above-described key data sharing method based on exponentiation. However, these differ from each other in the following three points. (1) G is generally called base point and has two-dimensional coordinates (Gx,Gy). (2) The exponentiation G^a is equivalent to a-time addition of the base point on an elliptic curve, which is referred to as a*G. (3) Since the result of calculation of b*(a*G) is a two-dimensional coordinate value, predetermined operation is carried out on this value to calculate a one-dimensional scalar value, and the message data M is encrypted with this scalar value as key data for symmetric encryption.

In this example, the description of E(Kpu,M) means E((G^a)^b,M)||Kpu2 or E(f(b*(a*G)),M)||Kpu2, as described above. In addition, f(b*(a*G)) means to find one scalar value from b*(a*G). Meanwhile, the description of E(*Kpu,M) means to symmetrically encrypt the message data M with *Kpu(G^a)^b or f(b*(a*G)). Also, decryption of M'=E(Kpu, M) is described as D(Kpr,M'). This means to carry out decryption operation D((G^b)^a,M'), or alternatively, D(f(a*(b*G)), M'), according to the symmetric encryption system with *Kpr=(G^b)^a, or alternatively, f(a*(b*G)).

Figure 6:
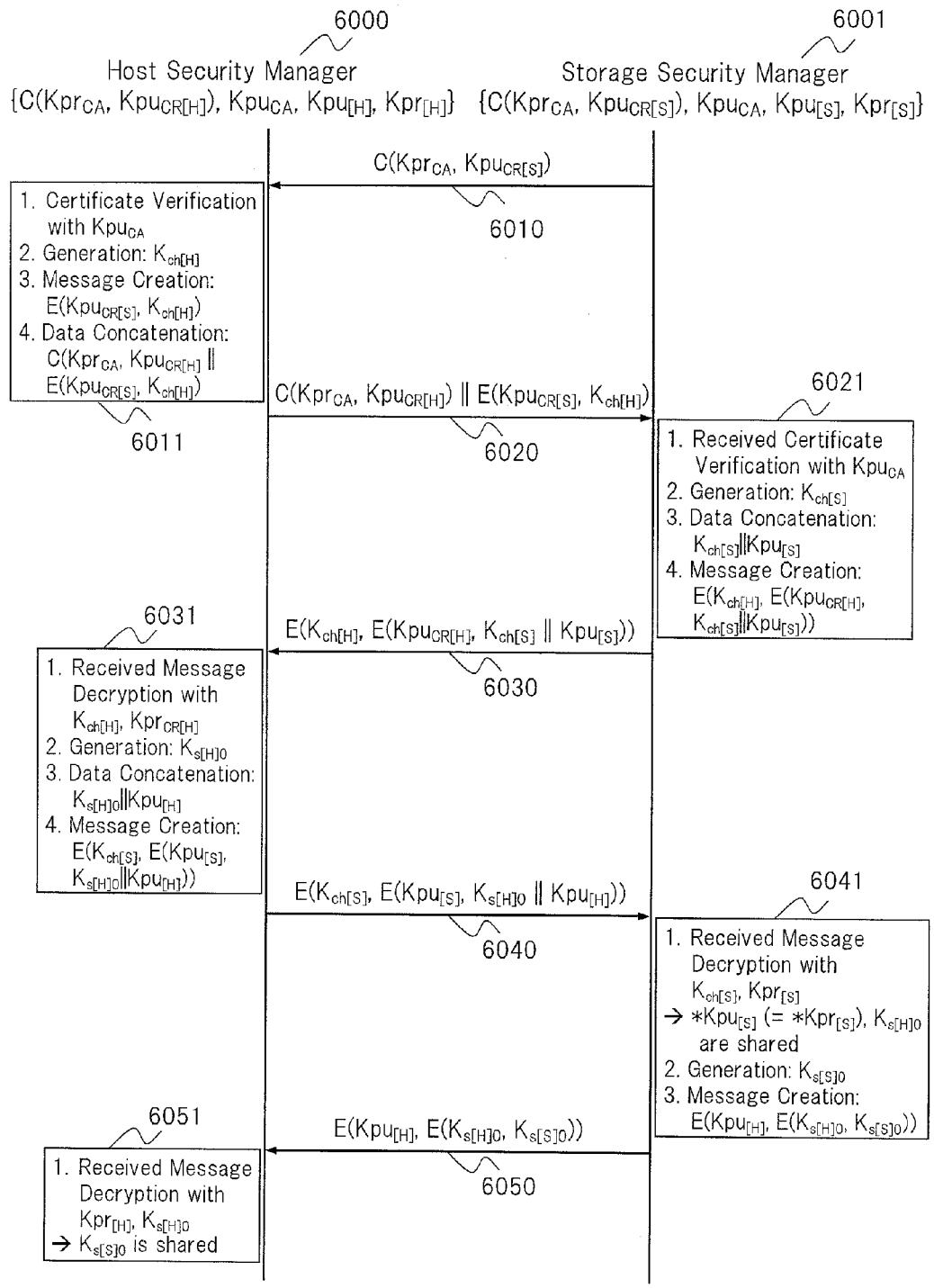
FIG. 6 is a flowchart showing an example of authentication executed prior to transfer of usage control information, in accordance with an embodiment of the present invention.

With reference now to FIG. 6, in accordance with embodiments of the present invention, a flowchart is shown that illustrates an example of authentication executed prior to transfer of usage control information. It is assumed that a certificate $C(Kpr_{CA}, Kpu_{CR[H]})$, a certificate authority public key $Kpu_{CA}$, a host device public key $Kpu_{[H]}$ and a host device private key $Kpr_{[H]}$ are stored in advance in the host device protected information storage 101 in the host security manager 111 (6000). Similarly, it is assumed that a certificate $C(Kpr_{CA}, Kpu_{CR[S]})$, a certificate authority public key $Kpu_{CA}$, a storage device public key $Kpu_{[S]}$ and a storage device private key $Kpr_{[S]}$ are stored in advance in the storage device protected information storage 224 in the storage security manager 225 (6001).

In operation 6010, the storage device protected information transfer function unit 221 in the storage security manager 225 transmits the certificate $C(Kpr_{CA}, Kpu_{CR[S]})$ stored in the storage device protected information storage 224 to the host security manager 111.

In operation 6011, (1) the host device protected information transfer function unit 104 in the host security manager 111 verifies the validity of the received certificate $C(Kpr_{CA}, Kpu_{CR[S]})$. (2) Next, when the validity of the received certificate is confirmed, a challenge key $K_{ch[H]}$ is generated. (3) Next, with the public key $Kpu_{CR[S]}$ included in the received certificate $C(Kpr_{CA}, Kpu_{CR[S]})$, $K_{ch[H]}$ is encrypted to generate encrypted data $E(Kpu_{CR[S]}, K_{ch[H]})$ (4) Next, the certificate $C(Kpr_{CA}, Kpu_{CR[H]})$ stored in the device itself is concatenated to the resulting encrypted data.

In operation 6020, the host device protected information transfer function unit 104 transmits the resulting data $C(Kpr_{CA}, Kpu_{CR[H]})||E(Kpu_{CR[S]}, K_{ch[H]})$ to the storage security manager 225.

In operation 6021, (1) the storage device protected information transfer function unit 221 verifies the validity of the received data. (2) Next, when the validity of the received data is confirmed, this data is decrypted with $Kpr_{CR[S]}$ stored in the device itself and $K_{ch[H]}$ is acquired. (3) Next, as the acquisition of this key is finished, a challenge key $K_{ch[S]}$ is generated and $K_{ch[S]}$ and the public key $Kpu_{[S]}$ stored in the device itself are concatenated. (4) Next, this concatenated data is encrypted by the public key $Kpu_{CR[H]}$ included in the received certificate of the host device, thus generating encrypted data $E(Kpu_{CR[H]}, K_{ch[S]}||Kpu_{[S]})$. Moreover, the resulting encrypted data is encrypted by the received $K_{ch[H]}$ to acquire encrypted data $E(K_{ch[H]}, E(Kpu_{CR[H]}, K_{ch[S]}||Kpu_{[S]}))$.

In operation 6030, the storage device protected information transfer function unit 221 transmits the resulting encrypted data to the host security manager 111.

In operation 6031, (1) the host device protected information transfer function unit 104 decrypts the received encrypted data by $K_{ch[H]}$ and the private key $Kpr_{CR[H]}$ retained in the device itself. (2) Next, a $0^{th}$-order session key $Ks_{[H]0}$ is generated. (3) Next, $Ks_{[H]0}$ and the public key $Kpu_{[H]}$ stored in the device itself are concatenated. (4) Next, after $Ks_{[H]0}||Kpu_{[H]}$ is encrypted by $Kpu_{[S]}$ included in the decryption result of the data, the result of the encryption is further encrypted by $K_{ch[S]}$, thus generating encrypted data $E(Kch_{[S]}, E(Kpu_{[S]}, Ks_{[H]0}||Kpu_{[H]}))$. As a result of this operation, *$Kpu_{[S]}$ is generated in the host device protected information transfer function unit 104.

In operation 6040, the host device protected information transfer function unit 104 transmits the resulting encrypted data $E(K_{ch[S]}, E(Kpu_{[S]}, Ks_{[H]0}||Kpu_{[H]}))$ to the storage security manager 225.

In operation 6041, (1) the storage device protected information transfer function unit 221 decrypts the received encrypted data by $K_{ch[S]}$ and the private key $Kpr_{[S]}$ retained in the device itself. As a result of this operation, *$Kpr_{[S]}$ is generated in the storage device protected information transfer function unit 221. *$Kpu_{[S]}$ and *$Kpr_{[S]}$ are the same value. (2) Next, a $0^{th}$-order session key $Ks_{[S]0}$ is generated. (3) Next, after this key is encrypted by $Ks_{[H]0}$ included in the decryption result of the received encrypted data, the result of the encryption is further encrypted by $Kpu_{[H]}$, thus generating encrypted data $E(Kpu_{[H]}, E(Ks_{[H]0}, Ks_{[S]0}))$. As a result of this operation, *$Kpu_{[H]}$ is generated in the storage security manager.

In operation 6050, the storage device protected information transfer function unit 221 transmits the resulting encrypted data $E(Kpu_{[H]}, E(Ks_{[H]0}, Ks_{[S]0}))$ to the host security manager 111.

In operation 6051, (1) the host device protected information transfer function unit 104 decrypts the received encrypted data by the private key $Kpr_{[H]}$ and the $0^{th}$-order session key $Ks_{[H]0}$ retained in the device itself. As a result of this operation, *$Kpr_{[S]}$ is generated in the host device protected information transfer function unit 104.

In addition, in the above description, an operation such as confirmation of integrity of data in decrypting the received encrypted data is not particularly mentioned. It is assumed that such an operation is executed as a matter of course. Also, in the process of authentication, an operation such as transmitting, from a device holding newer certificate expiration information, this certificate expiration information to the other device and overwriting the old certificate expiration information may be inserted.

The above-described authentication is by way of example without limitation thereto. Nevertheless, for the above-described authentication, when authentication is completed, key data for encrypting and transferring usage control information and key data for sharing that key data are shared between the devices which have executed the authentication. In the example shown in FIG. 6, as key data equivalent to these, sharing of the host device shared key *$Kpu_{[H]}$ (=*$Kpr_{[H]}$), the storage device shared key *$Kpu_{[S]}$ (=*$Kpr_{[S]}$), the host device $0^{th}$-order session key ($Ks_{[H]0}$) and the storage device $0^{th}$-order session key ($Ks_{[S]0}$) is completed. In the following operation, transfer of usage control information is carried out with these key data.

Figure 7A:
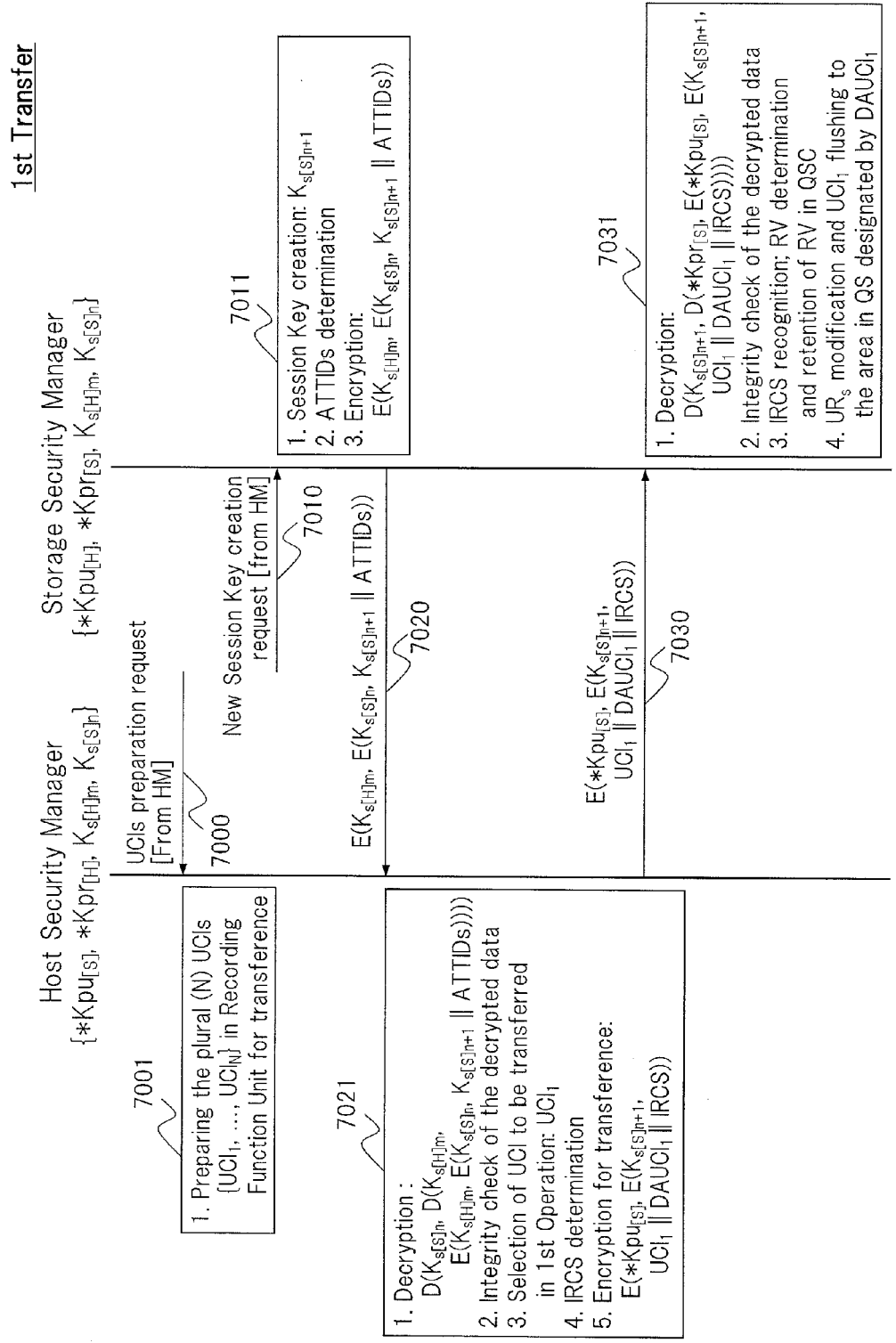
FIG. 7A is a flowchart showing a first example of transfer of usage control information from a content recorder/player to a detachable storage device, in accordance with an embodiment of the present invention.
Figure 7B:
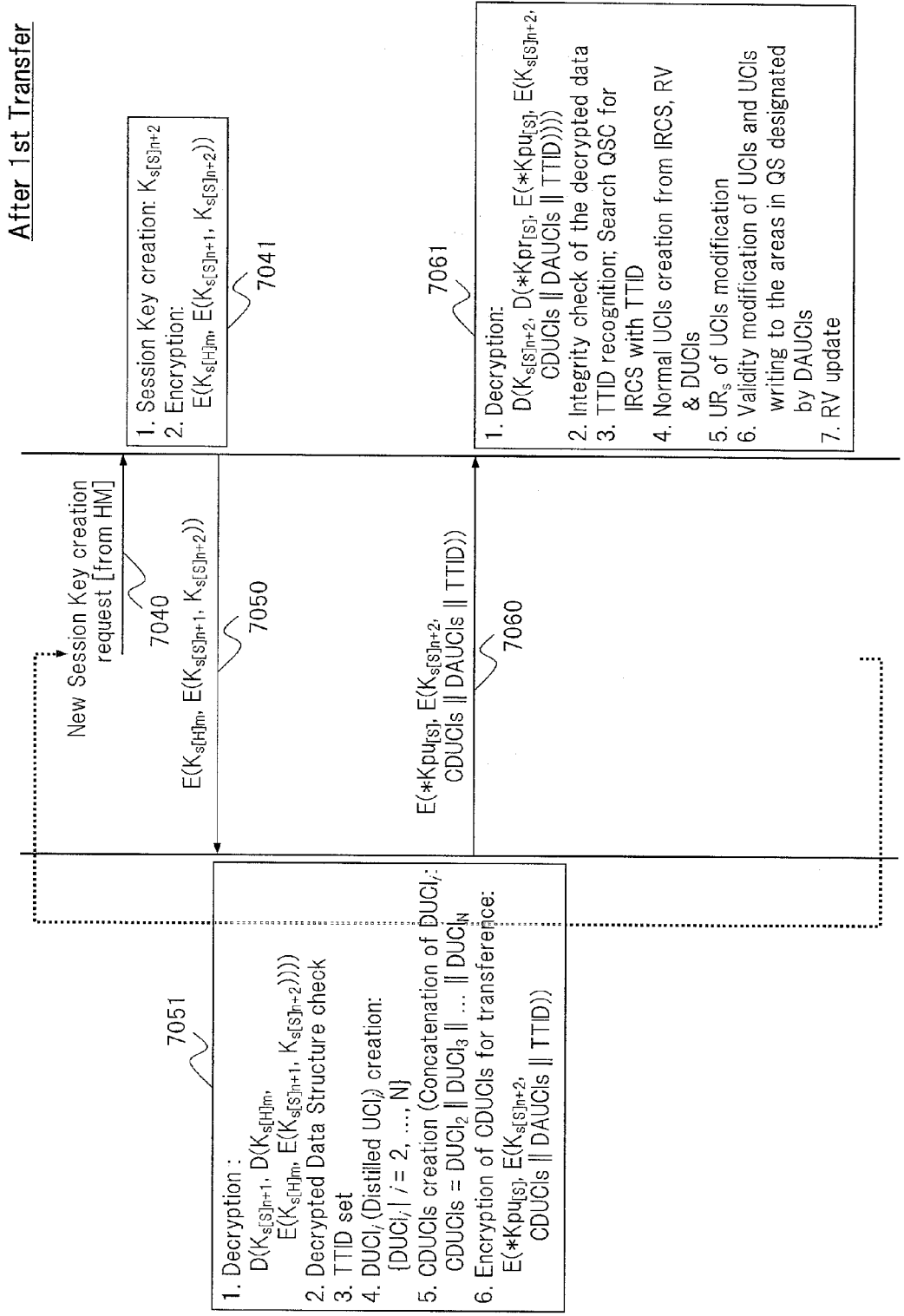
FIG. 7B is a flowchart showing the continuation of the first example, in accordance with an embodiment of the present invention.

First Example of Transfer of Usage Control Information from Recorder/Player to Storage Device With reference now to FIGS. 7A and 7B, in accordance with embodiments of the present invention, a flowchart is shown that illustrates a first example of transfer of usage control information from the host device 112 to the storage device 240. It is assumed that at the time of starting this transfer, *$Kpu_{[S]}$(=*$Kpr_{[S]}$), a host device $m^{th}$-order session key ($Ks_{[H]m}$) and a storage device $n^{th}$-order session key ($Ks_{[S]n}$) are shared between the host security manager 111 and the storage security manager 225. This means that by the time when this transfer is executed, transfer of usage control information from the host device 112 to the storage device 240 is executed n times and transfer of usage control information from the storage device 240 to the host device 112 is executed m times. In addition, n and m may be 0, that is, it may also be possible that only authentication is executed.

First Transfer of Usage Control Information

With further reference to FIG. 7A, in accordance with embodiments of the present invention, in operation 7000, the host manager 110 requests the recording function unit 102 and the host device protected information transfer function unit 104 in the host security manager 111 to prepare usage control information $UCI_1$ to $UCI_N$ scheduled to be transmitted to the storage device 240. Here, the number of usage control information $UCI_1$ to $UCI_N$ scheduled for transmission is N.

In operation 7001, the recording function unit 102 generates the N units of usage control information $UCI_1$ to $UCI_N$ scheduled for transmission. The host device protected information transfer function unit 104 temporarily stores these usage control information $UCI_1$ to $UCI_N$.

In operation 7010, the host manager 110 transmits a session key data creation request to the storage device protected information transfer function unit 221 in the storage security manager 225 while causing the host security manager 111 to execute operation 7001.

In operation 7011, (1) the storage device protected information transfer function unit 221 creates a session key $Ks_{[S]n+1}$. (2) Next, the qualified storage controller 222 determines an available transfer transaction identifier TTID that is not currently used, and generates an available transfer transaction identifier group ATTIDs in accordance with the result of the determination. (3) The storage device protected information transfer function unit 221 concatenates $Ks_{[S]n+1}$ and the available transfer transaction identifier group ATTIDs and encrypts the resulting data by $Ks_{[S]n}$ and $Ks_{[H]m}$. These $Ks_{[S]n}$ and $Ks_{[H]}$ are the latest ones of the session keys that are shared at the time of executing this operation and created by the storage device protected information transfer function unit 221 and the host device protected information transfer function unit 104 in the past.

In operation 7020, the storage device protected information transfer function unit 221 transmits the created encrypted data $E(Ks_{[H]m},E(Ks_{[S]n},Ks_{[S]n+1}\|ATTIDs))$ to the host manager 110.

Here, a transfer transaction identifier TTID is an identifier (ID) for specifying a transfer transaction sequence. As this identifier is added, transfer of a plurality of sequences may be caused to proceed simultaneously. Also, the available transfer transaction identifier group ATTIDs represents validity information Validity and unused transfer transaction identifiers TTID. If there are one or more unused transfer transaction identifiers TTID, the validity information Validity shows "valid" and the unused transfer transaction identifiers TTID are set. On the other hand, if there is no unused transfer transaction identifier TTID, the validity information Validity shows "invalid".

In operation 7021, (1) the host device protected information transfer function unit 104 decrypts the received encrypted data $E(Ks_{[H]m},E(Ks_{[S]n},Ks_{[S]n+1}\|ATTIDs))$ with $Ks_{[H]m}$ and $Ks_{[S]n}$ retained in the device itself. (2) Next, the host device protected information transfer function unit 104 confirms integrity of $Ks_{[S]n+1}$ acquired by the decryption.

Confirmation of integrity is, for example, confirmation of whether the tag value allocated to this key data has no error, or confirmation of whether the data has no error in accordance with an error detecting code attached to this key data. (3) Next, the host device protected information transfer function unit 104 selects one unit of usage control information $UCI_1$ that is to be transferred first, from the N units of usage control information $UCI_1$ to $UCI_N$ prepared in the above-described operation 7001. (4) Next, the recording function unit 102 decides a value to be set in each field in an information retention control specifier IRCS. This information retention control specifier IRCS is subsequently described in detail. (5) Next, the host device protected information transfer function unit 104 concatenates the usage control information $UCI_1$, its recording destination address $DAUCI_1$ (destination address for $UCI_1$) and the information retention control verifier IRCS, and encrypts the result by $Ks_{[S]n+1}$ acquired by the decryption and $*Kpu_{[S]}$ shared in the authentication.

In operation 7030, the host device protected information transfer function unit 104 transmits the created encrypted data $E(*Kpu_{[S]},E(Ks_{[S]n+1},UCI_1\|DAUCI_1\|IRCS))$ to the storage security manager 225. The specific configuration of the information retention control specifier IRCS is next described.

With reference now to FIG. 8, in accordance with embodiments of the present invention, a table is shown that details example contents of the information retention control specifier IRCS. The information retention control specifier IRCS includes a transfer transaction identifier (TTID), a retained information specifier (RIS), a UCIID increment width specifier (UCIIDIWS), and a CID increment width specifier (CIDIWS).

The transfer transaction identifier TTID is an identifier (ID) for specifying a transfer transaction sequence, as described above. This transfer transaction identifier TTID is decided by an unused transfer transaction identifier group ATTIDs.

The retained information specifier MS is information for notifying of the kind of information that is omitted from the usage control information UCI shown in FIG. 5, that is, information for designating the kind of information that is to be retained in the information included in the first usage control information $UCI_1$ to the storage security manager 225.

With reference now to FIG. 9, in accordance with an embodiment of the present invention, a table is shown that details example contents of the retained information specifier MS. This retained information specifier MS corresponds to information included in the usage control information UCI, with cipher information CI excluded, and expresses whether these units of information are to be retained or omitted in the form of a bit value, either 1 or 0.

For example, in cases such as where N content data corresponding respectively to N units of usage control information $UCI_1$ to $UCI_N$ scheduled for transmission collectively represent one content, the corresponding service type specifier CSTS, the usage rule enforced in storage security manager $UR_S$ and the usage rule enforced in playback function unit $UR_P$ of the information included in the usage control information $UCI_1$ to $UCI_N$ (see FIG. 5) are often of the same content. Moreover, it often happens that the usage control information identifier UCIID and the content identifier CID change according to a predetermined rule such as being continuous with a predetermined increment, for example, 1. Thus, in the retained information specifier RIS, the information having such relations is expressed as information to be omitted.

In addition, the UCIID increment width specifier UCI-IDIWS and the CID increment width specifier CIDIWS shown in FIG. 8 represent the increment of the usage control information identifier UCIID and the increment of the content identifier CID, respectively. These do not necessarily have to be designated. If these are not designated, a default value, for example, 1, is used as the increment.

As the information retention control specifier IRCS including the retained information specifier RIS as described above is encrypted and transferred together with the first usage control information $UCI_1$ to the storage device 240, the storage device 240 is notified of the kind of information omitted later in the usage control information $UCI_2$ to $UCI_N$.

With further reference to FIG. 7A, in accordance with embodiments of the present invention, in operation 7031, (1) the storage device protected information transfer function unit 221 decrypts the received encrypted data $E(*Kpu_{[S]}, E(Ks_{[S]n+1}, UCI_1 \| DAUCI_1 \| IRCS))$ with $*Kpr_{[S]}$ and $Ks_{[S]n+1}$ retained in the device itself. (2) Next, the storage device protected information transfer function unit 221 confirms integrity of $UCI_1 \| DAUCI_1 \| IRCS$ acquired by the decryption.

(3) Next, the qualified storage controller 222 interprets the values of the transfer transaction identifier TTID, the retained information specifier RIS, the UCIID increment width specifier UCIIDIWS, and the CID increment width specifier CIDIWS included in the information retention control specifier IRCS. In this case, if the transfer transaction identifier TTID is allocated to another transfer transaction, the storage device protected information transfer function unit 221 suspends the present transfer transaction and notifies the host device protected information transfer function unit 104 to set another value as the transfer transaction identifier TTID. Also, the qualified storage controller 222 retains the information concerned of the information included in the first usage control information $UCI_1$ as reference value RV used for later restoring the usage control information UCI from distilled usage control information DUCI, based on the retained information specifier RIS. In the above-described operation 7020, if the available transfer transaction identifier group ATTIDs specifies no available transfer transaction identifier TTID, the qualified storage controller 222 does not retain a reference value RV in this operation.

(4) Next, after changing the usage rule enforced in storage security manager $UR_S$ according to a predetermined rule, the qualified storage controller 222 stores the first usage control information $UCI_1$ at the position in the qualified storage 223 that is designated by $DAUCI_1$. As the storage is completed, this usage control information $UCI_1$ is erased from the qualified storage controller 222.

Second and Subsequent Transfer Transaction of Usage Control Information

With further reference to FIG. 7B, in accordance with embodiments of the present invention, in operation 7040, the host manager 110 transmits a session key data creation request to the storage device protected information transfer function unit 221, as in the above-described operation 7010.

In operation 7041, (1) the host device protected information transfer function unit 104 creates a session key $Ks_{[S]n+2}$. (2) Next, the created $Ks_{[S]n+2}$ is encrypted with $Ks_{[S]n+1}$ and $Ks_{[H]m}$. These $Ks_{[S]n+1}$ and $Ks_{[H]m}$ are the latest ones of the session keys that are shared at the time of executing this operation and created by the storage device protected information transfer function unit 221 and the host device protected information transfer function unit 104 in the past.

In operation 7050, the storage device protected information transfer function unit 221 transmits the created encrypted data $E(Ks_{[H]m}, E(Ks_{[S]n+1}, Ks_{[S]n+2}))$ to the host device 112.

In operation 7051, (1) the host device protected information transfer function unit 104 decrypts the received encrypted data $E(Ks_{[H]m}, E(Ks_{[S]n}, Ks_{[S]n+1}))$ with $Ks_{[H]m}$ and $Ks_{[S]n+1}$ retained in the device itself. (2) Next, integrity of the resulting $Ks_{[S]n+2}$ is confirmed. (3) Next, the recording function unit 102 sets the transfer transaction identifier TTID set in the field 0 of the information retention control specifier IRCS in the above-described operation 7021.4, as the transfer transaction identifier TTID for identifying this transfer transaction. In addition, the recording function unit 102 may be notified of the transfer transaction identifier TTID by the host manager 110. In this case, the recording function unit 102 confirms whether the information retention control specifier IRCS determined by the transfer transaction identifier TTID is retained, or not. If the transfer transaction identifier TTID is not retained, this transfer transaction is suspended.

(4) Next, the recording function unit 102 selects information to be transmitted to the storage device 240 in accordance with the content designated by the retained information specifier RIS shown in FIG. 9 with respect to the usage control information $UCI_2$ to $UCI_N$, which are left after excluding the first usage control information $UCI_1$ from the N units of usage control information $UCI_1$ to $UCI_N$ prepared in the above-described operation 7001. The information acquired by leaving only necessary information and omitting unnecessary information from the usage control information UCI in accordance with the content designated by the retained information specifier RIS is called distilled usage control information DUCI. This distilled usage control information DUCI is an example omission information group.

For example, in the retained information specifier RIS shown in FIG. 9, if the value of the $0^{th}$ bit according to the corresponding service type specifier CSTS is 1, the corresponding service type specifier CSTS is left in the distilled usage control information DUCT. If the value of this $0^{th}$ bit is 0, the corresponding service type specifier CSTS is omitted from the distilled usage control information DUCI. The same applies to the others, which are: the usage control information identifier UCIID, the usage rule enforced in storage security manager $UR_S$, the usage rule enforced in playback function unit $UR_P$, the content identifier CID, and the other information OI. The designation of retention in the retained information specifier RIS is not limited to the form with a bit value of either 0, or 1, and the designation of retention in the retained information specifier RIS may be specified by an integral value, or similar value.

(5) Next, the recording function unit 102 concatenates the generated N−1 units of distilled usage control information $DUCI_2$ to $DUCI_N$; and, thus, creates concatenated distilled usage control information CDUCIs. (6) Next, the host device protected information transfer function unit 104 concatenates a destination address for UCIs DAUCIs and the transfer transaction identifier TTID acquired in the above-described operation 7021.4 to the created concatenated distilled usage control information CDUCIs; and, encrypts this with $Ks_{[S]n+2}$ acquired in the above-described operation 7021.2 and $*Kpu_{[S]}$ shared in the authentication.

In operation 7060, the host device protected information transfer function unit 104 transmits the created encrypted data $E(*Kpu_{[S]}, E(Ks_{[S]n+2}, CDUCIs \| DAUCIs \| TTID))$ to the storage device 240. In this manner, the N−1 units of distilled usage control information $DUCI_2$ to $DUCI_N$ are collectively encrypted and transmitted to the storage device 240.

In addition, in the above-described operation 7051.5 to 7051.6, the distilled usage control information DUCI is concatenated and encrypted with $Ks_{[S]n+2}$ and $*Kpu_{[S]}$. However, the individual units of distilled usage control information DUCI may be separately encrypted first, and then, concatenated. In such a case, it suffices to concatenate the destination address for UCIs DAUCIs and the transfer transaction identifier TTID only to $DUCI_2$. That is, $E(*Kpu_{[S]}, E(Ks_{[S]n+2}, DUCI_2 \| DAUCIs \| TTID)) \| E(*Kpu_{[S]}, E(Ks_{[S]n+2}, DUCI_3)) \| \ldots \| E(*Kpu_{[S], E(Ks[S]n+2)}, DUCI_N))$ is created.

In operation 7061, (1) the storage device protected information transfer function unit 221 decrypts the received encrypted data $E(*Kpu_{[S]}, E(Ks_{[S]n+1}, CDUCIs \| DAUCI \| TTID))$ with $Ks_{[S]n+2}$ and $*Kpr_{[S]}$ retained in the device itself. (2) Next, integrity of the resulting CDUCIs‖DAUCI‖TTID is confirmed. (3) Next, the qualified storage controller 222 uses the resulting transfer transaction identifier TTID and searches for whether the information retention control specifier IRCS identified by this is retained in the qualified storage controller 222, or not. If the information retention control specifier IRCS identified by this transfer transaction identifier TTID is not detected, the qualified storage controller 222 suspends writing of the usage control information UCI to the qualified storage.

Also, the qualified storage controller 222 may suspend this transfer transaction when the kind of information omitted from the received concatenated distilled usage control information CDUCIs is different from the kind of information designated for retention by the retained information specifier RIS shown in FIG. 9. Such cases include, for example, a case where despite the fact that retention of the usage rule enforced in storage security manager $UR_S$ is designated by the retained information specifier RIS shown in FIG. 9, the usage rule enforced in storage security manager $UR_S$ is included in the received distilled usage control information DUCI. In this case, the qualified storage controller 222 may notify the host device 112 of the kind of information that is different.

(4) Next, the qualified storage controller 222 creates usage control information $UCI_2$ to $UCI_N$ from the concatenated distilled usage control information CDUCIs based on the transfer transaction identifier TTID, and the retained information specifier RIS, the UCIID increment width specifier UCIIDIWS and the CID increment width specifier CIDIWS that are retained in the device itself.

Specifically, the qualified storage controller 222 retains the information designated by the retained information specifier RIS of the information included in the first usage control information $UCI_1$, as the reference value RV, through the above-described operation 7031. Therefore, based on this reference value RV, the usage control information $UCI_2$ to $UCI_N$ is restored from the individual units of distilled usage control information $DUCI_2$ to $DUCI_N$ included in the received concatenated distilled usage control information CDUCIs.

For example, in the case where the corresponding service type specifier CSTS is omitted from the concatenated distilled usage control information CDUCIs, the corresponding service type specifier CSTS included in the first usage control information $UCI_1$ is retained as the reference value RV. Therefore, this reference value RV is added to each distilled usage control information DUCI and the usage control information $UCI_2$ to $UCI_N$ is thus restored. Also, the same applies to the case where the usage rule enforced in storage security manager $UR_S$ or the usage rule enforced in playback function unit $UR_P$ is omitted from the concatenated distilled usage control information CDUCIs.

Moreover, for example, in the case where the usage control information identifier UCIID is omitted from the concatenated distilled usage control information CDUCIs, the usage control information identifier UCIID included in the first usage control information $UCI_1$ is retained as the reference value RV. Therefore, as a value corresponding to the rule of change is sequentially added to this reference value RV, a value that is to be added to each distilled usage control information DUCI is calculated; and, the usage control information $UCI_2$ to $UCI_N$ is thus restored. Here, the value corresponding to the rule of change is the value indicated by the UCIID increment width specifier UCIIDIWS, or alternatively, the CID increment width specifier CIDIWS shown in FIG. 8. Also, the same applies to the case where the content identifier CID is omitted from the concatenated distilled usage control information CDUCIs.

For example, in the case where the usage control information identifier UCIID is omitted, the following is assumed:

the value of the usage control information identifier UCIID of the distilled usage control information $DUCI_2$=the value of the reference value RV, which is the value of the usage control information identifier UCIID of the usage control information $UCI_1$, +the value of the UCIID increment width specifier UCIIDIWS;

the value of the usage control information identifier UCIID of the distilled usage control information $DUCI_3$=the value of the reference value RV+2× the value of the UCIID increment width specifier UCIIDIWS;

the value of the usage control information identifier UCIID of the distilled usage control information $DUCI_N$=the value of the reference value RV+(N−1)×the value of the UCIID increment width specifier UCIIDIWS.

In addition, all the values of the information retention control specifier IRCS retained in the recording function unit 102 and the qualified storage controller 222 are invalidated once power supply of the entire device is temporarily interrupted, or alternatively, authentication is executed again. Thus, even in the case where transfer transaction is identified by the same transfer transaction identifier TTID, association with previously executed transfer transactions may be broken off.

Back to the description of operation 7061, (5) the qualified storage controller 222 subsequently changes the usage rule enforced in storage security manager $UR_S$ included in each of the created usage control information $UCI_2$ to $UCI_N$ according to need. (6) Next, the qualified storage controller 222 stores the usage control information $UCI_2$ to $UCI_N$ to the qualified storage 223. (7) Next, if the usage control information identifier UCIID and the content identifier CID are dynamically created in the above-described operation 7061.4, the qualified storage controller 222 updates the reference values RV corresponding to these, to the values of the usage control information identifier UCIID and the content identifier CID of $UCI_N$.

According to this embodiment as described above, distilled usage control information $DUCI_2$ to $DUCI_N$ from which information having a predetermined relation is omitted is created from N−1 units of usage control information $UCI_2$ to $UCI_N$ that are left after excluding the first usage control information $UCI_1$ of N units of usage control information, and these are used for transfer transaction. Therefore, the volume of information that are to be encrypted or decrypted and transferred may be decreased and the processing load on the host device 112 and the storage device 240 may be reduced.

In addition, in this embodiment as described above, batched transfer transaction is carried out with respect to the N−1 units of usage control information $UCI_2$ to $UCI_N$ that are left after excluding the first usage control information $UCI_1$ of the N units of usage control information, in the above-described operations 7051.4-6 to operation 7060. However, instead of being limited to this, the transfer may be divided into a plurality of times. Also, if usage control information UCI similar to the transferred usage control information $UCI_1$ to $UCI_N$ is subsequently transferred after the above-described operation 7061 is completed, the above-described operations 7040 to 7061 may be repeated with the information retention control specifier IRCS retained in the qualified storage controller 222.

Moreover, a plurality of sequences of usage control information groups, for example, a usage control information group $UCI_{1a}$ to $UCI_{Na}$ and a usage control information group $UCI_{1b}$ to $UCI_{Mb}$ may be transferred in a mixed manner. For example, after the above-described operations 7000 to 7031 are carried out with respect to the usage control information $UCI_{1a}$, the above-described operations 7000 to 7031 are carried out with respect to the usage control information $UCI_{1b}$. After that, after the above-described operations 7040 to 7061 are carried out with respect to the usage control information $UCI_{2a}$ to $UCI_{Na}$, the above-described operations 7040 to 7061 are carried out with respect to the usage control information $UCI_{2b}$ to $UCI_{Nb}$. Since these plurality of sequences of usage control information groups are identified by transfer transaction identifiers TTID, such transfer transaction is possible.

Figure 10A:
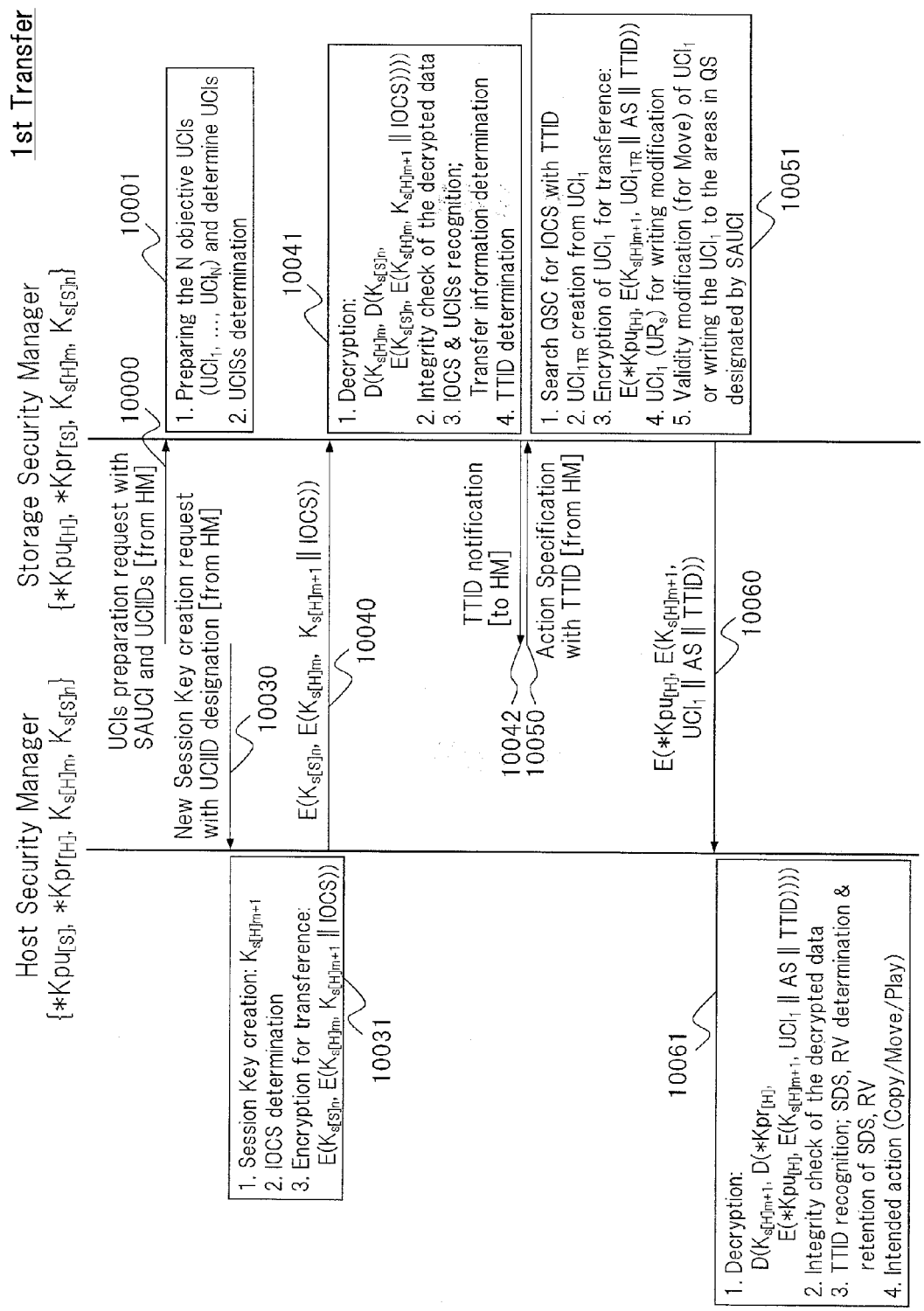
FIG. 10A is a flowchart showing a first example of transfer of usage control information from a detachable storage device to a content recorder/player, in accordance with an embodiment of the present invention.
Figure 10B:
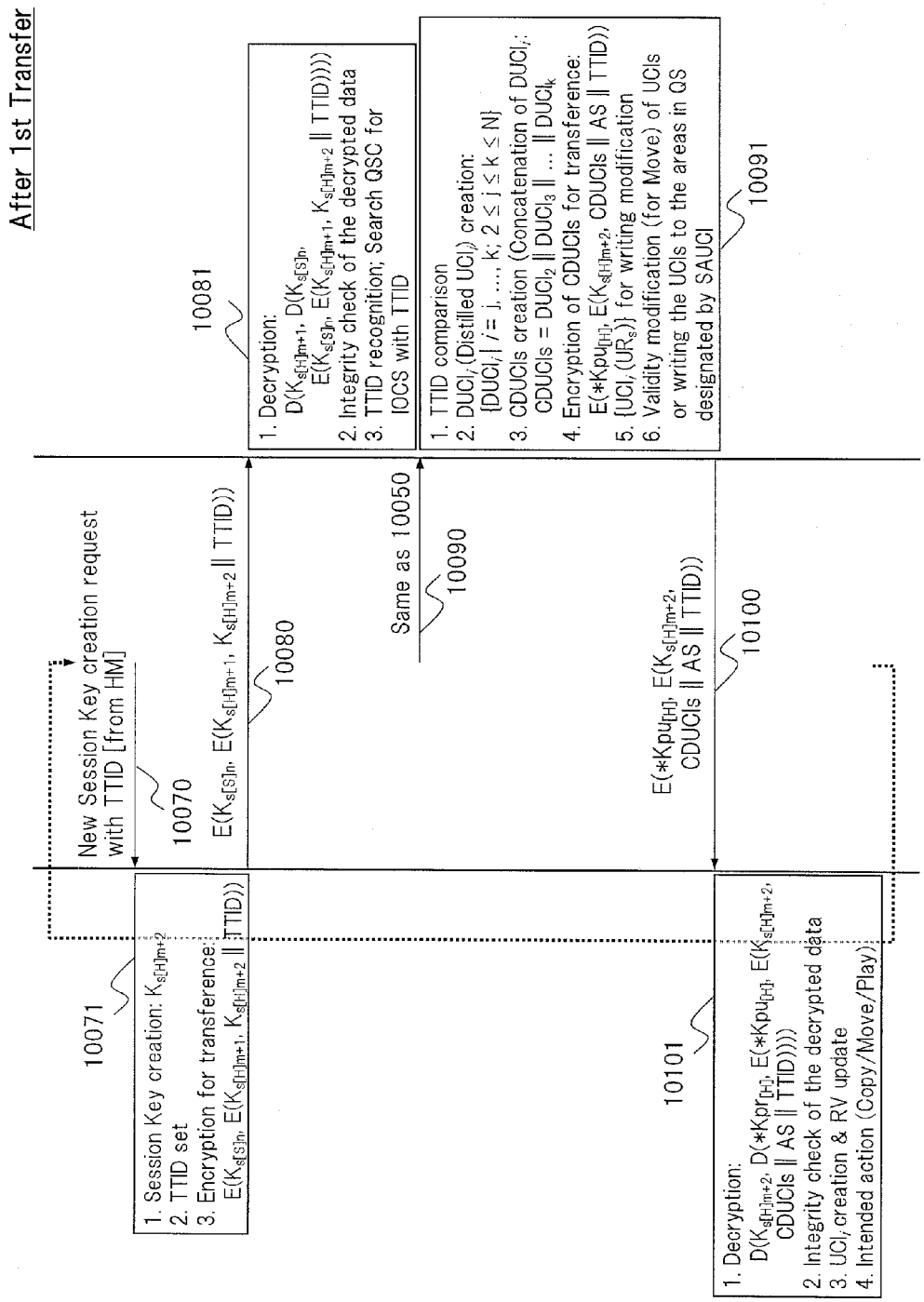
FIG. 10B is a flowchart showing the continuation of the first example, in accordance with an embodiment of the present invention.

First Example of Transfer Transaction of Usage Control Information from Storage Device to Host Device With reference now to FIGS. 10A and 10B, in accordance with embodiments of the present invention, a flowchart is shown that illustrates a first example of transfer transaction of usage control information from the storage device 240 to the host device 112. As in the foregoing case of FIGS. 7A and 7B, it is assumed that $*Kpu_{[S]}$ ($=*Kpr_{[S]}$), the host device m-th order session key ($Ks_{[H]m}$) and the storage device n-th order session key ($Ks_{[S]n}$) are shared between the host security manager 111 and the storage security manager 225.
First Transfer of Usage Control Information With further reference to FIG. 10A, in accordance with embodiments of the present invention, in operation 10000, the host manager 110 requests the storage device protected information transfer function unit 221 to read out N units of usage control information $UCI_1$ to $UCI_N$ scheduled for transmission to the host device 112, from the qualified storage 223 to the storage device protected information transfer function unit 221, and prepare for transfer transaction.

At this time, the host manager 110 transmits the addresses on the qualified storage 223 where the N units of usage control information $UCI_1$ to $UCI_N$ scheduled for transmission are stored, and the usage control information identifier UCIID for specifying these units of usage control information $UCI_1$ to $UCI_N$. In addition, the usage control information identifier UCIID need not necessarily be designated. For example, if the storage device 240 is a HDD including an advanced-technology-attachment (ATA) interface, the storage device 240 is notified of the address where the first usage control information $UCI_1$ is stored and the number N of usage control information $UCI_1$ to $UCI_N$ that are to be read out, as parameters included in a read command. At this time, it is efficient to set only the usage control information identifier UCIID of the first usage control information $UCI_1$.

In 10001, (1) the qualified storage controller 222 reads out the usage control information $UCI_1$ to $UCI_N$ from the qualified storage 223 and temporarily stores them. Here, the qualified storage controller 222 also functions as a temporary storage unit which temporarily stores the usage control information $UCI_1$ to $UCI_N$ that are to be transferred. (2) Next, the qualified storage controller 222 decides usage control information storage status UCISs for the read-out usage control information $UCI_1$ to $UCI_N$. A method for deciding the usage control information storage status UCISs is next described.

With reference now to FIG. 11, in accordance with embodiments of the present invention, a table is shown that details example contents of the usage control information storage status UCISs. The usage control information storage status UCISs includes: information representing coincidence of the corresponding service type specifier CSTS; the usage rule enforced in storage security manager $UR_S$; and, the usage rule enforced in playback function unit $UR_P$ included in each of the usage control information $UCI_1$ to $UCI_N$ (expressed as CSTSC, $UR_SC$, $UR_PC$, respectively). For example, if all the corresponding service type specifiers CSTS included in the usage control information $UCI_1$ to $UCI_N$ are coincident, 0 is set in the $0^{th}$ field. If at least one of them is not coincident, 1 is set. The same applies to the usage rule enforced in storage security manager $UR_S$ and the usage rule enforced in playback function unit $UR_P$.

Also, the usage control information storage status UCISs includes information indicating the storage status in the qualified storage 223 of the individual units of usage control information $UCI_1$ to $UCI_N$ requested for reading, in the third or subsequent field. If the storage status of the individual units of usage control information $UCI_1$ to $UCI_N$ is valid, 1 is set. If the status is invalid, 0 is set. Instead of being limited to this, whether all of the usage control information $UCI_1$ to $UCI_N$ is valid, or invalid, may be expressed in one field. Whether the storage status is valid, or invalid, is determined, for example, according to whether usage control information UCI including a usage control information identifier UCIID of the same value as the designated value from the host manager 110 is stored at the address designated from the host manager 110, in the qualified storage 223.

With further reference to FIG. 10A, in accordance with embodiments of the present invention, in operation 10030, the host manager 110 transmits a session key data creation request to the host device protected information transfer function unit 104 while causing the storage security manager 225 to execute the above-described operation 10001.

In operation 10031, (1) the host device protected information transfer function unit 104 creates a session key $Ks_{[H]m+1}$. (2) Next, the playback function unit 103 decides a value to be set in each field in an information output control specifier IOCS. This information output control specifier IOCS corresponds to the above-described information retention control specifier IRCS and the information output control specifier IOCS is subsequently described in detail. (3) Next, the host device protected information transfer function unit 104 concatenates the created $Ks_{[H]m+1}$ and the information output control specifier IOCS and encrypts the resulting data with $Ks_{[H]m}$ and $Ks_{[S]n}$. $Ks_{[H]m}$ and $Ks_{[S]n}$ are the latest ones of the session keys that are shared at the time of executing this operation and created in the past by the host device protected information transfer function unit 104 and the storage device protected information transfer function unit 221.

In operation 10040, the host device protected information transfer function unit 104 transmits the created encrypted data $E(Ks_{[S]n}, E(Ks_{[H]m}, Ks_{[H]m+1}\|IOCS))$ to the storage devices 240.

In operation 10041, (1) the storage device protected information transfer function unit 221 decrypts the received encrypted data $E(Ks_{[S]n}, E(Ks_{[H]m}, Ks_{[H]m+1}\|IOCS))$ with $Ks_{[S]n}$ and $Ks_{[H]m}$ retained in the device itself. (2) Next, integrity of the resulting $Ks_{[H]m+1}\|IOCS$ is confirmed. (3) Next, the qualified storage controller 222 collates the received information output control specifier IOCS with the usage control information storage status UCISs decided in the above-described operation 10001.2 and determines whether this transfer transaction may be continued. The configuration of the information output control specifier IOCS is next described.

With reference now to FIG. 12, in accordance with an embodiment of the present invention, a table is shown that details example contents of the information output control specifier IOCS. The information output control specifier IOCS includes: an output information specifier (referred to as OIS), a start UCIID, an end UCIID, a UCIID increment width specifier, a start CID, an end CID, and a CID increment width specifier.

The start UCIID and the end UCIID represent the minimum value and the maximum value of usage control identifiers UCIID included in each of the plurality of units of usage control information $UCI_1$ to $UCI_N$ which the storage device 240 is requested to transmit. Also, the start CID and the end CID represent the minimum value and the maximum value of content identifiers CID included in each of the plurality of units of usage control information $UCI_1$ to $UCI_N$ which the storage device 240 is requested to transmit.

Moreover, the output information specifier OIS is information for designating the kind of information that is to be omitted from the usage control information $UCI_1$ to $UCI_N$ and has the same configuration as the retained information specifier RIS shown in FIG. 9. As such an information output control specifier IOCS including the output information specifier OIS is transferred from the host device 112 to the storage devices 240, the storage devices 240 is notified of the kind of information omitted from the usage control information $UCI_2$ to $UCI_N$ later.

Such an information output control specifier IOCS is collated with the usage control information storage status UCISs in the above-described operation 10041.3. That is, collation is carried out to find whether the kind of information that is found coincident by the usage control information storage status UCISs and the kind of information designated for omission by the output information specifier OIS are not different from each other.

For example, if the corresponding service type specifier CSTS is designated as information that is to be omitted in the output information specifier OIS despite the fact that it is shown in the usage control information storage status UCISs that the corresponding service type specifier CSTS included in the usage control information $UCI_1$ to $UCI_N$ to be transferred is not coincident, it is determined that continuation of this transfer transaction is impossible. Also, the same applies to the usage rule enforced in storage security manager $UR_S$ and the usage rule enforced in playback function unit $UR_P$.

Also, in the case the storage status of at least one of the usage control information $UCI_1$ to $UCI_N$ specified by the start UCIID, the end UCIID, the UCIID increment width specifier, the start CID, the end CID, and the CID increment width specifier in the information output control specifier IOCS is invalid, it is determined that continuation of this transfer transaction is impossible. Whether the storage status is valid, or invalid, is determined by the value of the third, or subsequent field, of the usage control information storage status UCISs.

In addition, if the transfer transaction is suspended in this manner, the host device 112 may be notified of the cause of the suspension, for example, which kind of information of the usage control information UCI is different, or has similar status, together with the fact that the transfer transaction is suspended.

With further reference to FIG. 10A and operation 10041, in accordance with embodiments of the present invention, (4) the qualified storage controller 222 subsequently selects a value of an unused transfer transaction identifier TTID at this point and decides a transfer transaction identifier TTID to be used for this transfer transaction. Then, the qualified storage controller 222 retains this transfer transaction identifier TTID in association with the received information output control specifier IOCS.

In operation 10042, the storage device protected information transfer function unit 221 notifies the host manager 110 of the decided transfer transaction identifier TTID.

In operation 10050, the host manager 110 notifies the storage devices 240 of which application the usage control information $UCI_1$ to $UCI_N$ is transferred for, together with the received transfer transaction identifier TTID. Example applications here include: decryption and play of content data at the playback function unit 103 of the host device 112; copy or move of the usage control information UCI to another storage device; and similar applications.

In operation 10051, (1) the qualified storage controller 222 searches the device itself with the designated transfer transaction identifier TTID, and (2) selects the usage control information $UCI_1$ that is transferred first, from the N units of usage control information $UCI_1$ to $UCI_N$ prepared in the above-described operation 10001, and creates usage control information $UCI_{1TR}$ for transfer that is actually transferred to the host device 112. This operation is achieved by duplicating the usage control information $UCI_1$ within the storage device protected information transfer function unit 221 and then changing the usage rule enforced in storage security manager $UR_S$ included in the duplicated usage control information $UCI_1$, according to the command received in the above-described operation 10050.

(3) Next, the storage device protected information transfer function unit 221 concatenates the created usage control information $UCI_{HR}$ for transfer, an action specifier AS for specifying the command received in the above-described operation 10050, and the designated transfer transaction identifier TTID, and encrypts the resulting data with $Ks_{[H]m+1}$ obtained in the above-described operation 10041.2 and $*Kpu_{[H]}$ whose sharing is completed in the authentication. (4) Next, the usage control information $UCI_{1TR}$ for transfer is erased from the storage device protected information transfer function unit 221 and the usage rule enforced in storage security manager $UR_S$ 303 of the usage control information $UCI_1$ is changed according to the command received in the above-described operation 10050.

(5) Next, the qualified storage controller 222 writes the created usage control information $UCI_1$ back to the place where the usage control information $UCI_1$ is originally stored in the qualified storage 223. The usage control information $UCI_1$ existing in the qualified storage controller 222 may continue to be retained without being invalidated. In addition, if the command received in the above-described operation 10050 is to move, the usage control information $UCI_1$ on the qualified storage 223 and the usage control information $UCI_1$ in the qualified storage controller 222 are invalidated before the usage control information $UCI_{1TR}$ for transfer is transmitted.

In operation 10060, the storage device protected information transfer function unit 221 transmits the created encrypted data $E(*Kpu_{[H]},E(Ks_{[H]m+1},UCI_{1TR}\|AS\|TTID))$ to the host security manager 111.

In operation 10061, (1) the host device protected information transfer function unit 104 decrypts the received encrypted data $E(*Kpu_{[H]},E(Ks_{[H]m+1},UCI_{1TR}\|AS\|TTID))$ with $*Kpr_{[H]}$ and $Ks_{[H]m+1}$ retained in the device itself. (2) Next, integrity of the resulting $UCI_{1_{TR}}\|AS\|TTID$ is confirmed.

(3) Next, the playback function unit 103 extracts information that is to be retained in the device itself from the received usage control information $UCI_{1_{TR}}$ based on the value set for the information output control specifier IOCS in the above-described operation 10031.2, and retains the information as a reference value RV. Moreover, the playback function unit 103 also retains the received transfer transaction identifier TTID and information specifying the storage device that transmits this, as a reference value RV. Here, the purpose of retaining the information specifying the storage device together with the transfer transaction identifier TTID is to enable a security manager as a transfer transaction counterpart to be specified even if this transfer transaction identifier TTID is already utilized. This information specifying the storage device is called storage device specifier SDS. If the designated transfer transaction identifier TTID is already allocated to another transfer transaction, the playback function unit 103 suspends this transfer transaction and responds to the host device protected information transfer function unit 104 so as to set another value as a transfer transaction identifier TTID. (4) After that, a predetermined operation according to the action specifier AS is executed in the host device 112.

Second and Subsequent Transfer of Usage Control Information

With further reference to FIG. 10B, in accordance with embodiments of the present invention, in operation 10070, the host manager 110 transmits a session key data creation request to the host device protected information transfer function unit 104, as in the above-described operation 10030.

In operation 10071, (1) the host device protected information transfer function unit 104 creates a session key $Ks_{[H]m+2}$. (2) Next, the playback function unit 103 searches to find out whether a transfer transaction identifier TTID having the same value as the transfer transaction identifier TTID designated by the host manager 110 exits among the transfer transaction identifiers TTID retained in the device itself. If the intended one is detected, the received transfer transaction identifier TTID is set as the value of transfer transaction identifier TTID. If the intended one is not detected, this transfer transaction is suspended. (3) Next, the host device protected information transfer function unit 104 concatenates the created $Ks_{[H]m+2}$ and the set transfer transaction identifier TTID and encrypts the result with $Ks_{[H]m+1}$ and $Ks_{[S]n}$.

In operation 10080, the host device protected information transfer function unit 104 transmits the created encrypted data $E(Ks_{[S]n}, E(Ks_{[H]m+1}, Ks_{[H]m+2}\|TTID))$ to the storage devices 240.

In operation 10081, the storage device protected information transfer function unit 221 decrypts the received encrypted data $E(Ks_{[S]n}, E(Ks_{[H]m+1}, Ks_{[H]m+2}\|TTID))$ with $Ks_{[S]n}$ and $Ks_{[H]m+1}$ retained in the device itself. (2) Next, integrity of the resulting $Ks_{[H]m+2}\|TTID$ is confirmed. (3) Next, the qualified storage controller 222 searches itself with the acquired transfer transaction identifier TTID. If the information output control specifier IOCS designated by this transfer transaction identifier TTID is found, the detection flag for this information output control specifier IOCS is set to valid and the content of this information output control specifier IOCS is interpreted.

In operation 10090, the host manager 110 issues the same command as in the above-described operation 10050.

In operation 10091, (1) the qualified storage controller 222 searches to find out whether a transfer transaction identifier TTID having the same value as the transfer transaction identifier TTID designated by the host manager 110 in the above-described operation 10090 exits among information output control specifiers IOCS having a valid detection flag. If there is none, this transfer transaction is suspended.

(2) Next, the qualified storage controller 222 duplicates usage control information designated by the information output control specifier IOCS, from the usage control information $UCI_2$ to $UCI_N$ which remain after excluding the first usage control information $UCI_1$ of the N units of usage control information UCI prepared in the above-described operation 10001, and temporarily creates usage control information $UCI_{jTR}$ to $UCI_{kTR}$ for transfer. Then, the qualified storage controller 222 leaves information according to the content designated by the output information specifier OIS with respect to these usage control information $UCI_{jTR}$ to $UCI_{kTR}$ for transfer, omits unnecessary information, creates distilled usage control information $DUCI_{jTR}$ to $DUCI_{kTR}$, and then transmits these to the storage security manager 225. In addition, the structure of the output information specifier OIS is the same as the retained information specifier RIS shown in FIG. 9. Also, the method of creating distilled usage control information DUCT with the output information specifier OIS is as described above.

(3) Next, the storage device protected information transfer function unit 221 concatenates all the created distilled usage control information DUCI and thus creates concatenated distilled usage control information CDUCIs. (4) Next, the storage device protected information transfer function unit 221 concatenates the action specifier AS received in the above-described operation 10090 to the concatenated distilled usage control information CDUCIs and encrypts the result with $Ks_{[H]m+2}$ acquired in the above-described operation 10081.2 and $*Kpu_{[H]}$ whose sharing is completed in the authentication. (5) Next, the storage device protected information transfer function unit 221 erases the usage control information $UCI_{jTR}$ to $UCI_{kTR}$ for transfer and changes the usage rule enforced in storage security manager $UR_S$ of the usage control information $UCI_j$ to $UCI_k$ retained in the qualified storage controller 222, according to the command in the above-described operation 10090.

(6) Next, the qualified storage controller 222 writes the created usage control information $UCI_j$ to $UCI_k$ back to the place where these are originally stored. At this time, the usage control information $UCI_j$ to $UCI_k$ in the qualified storage controller 222 may continued to be retained without being invalidated. In addition, if the command in the above-described operation 10090 is to move, the usage control information $UCI_j$ to $UCI_k$ on the qualified storage and the usage control information $UCI_j$ to $UCI_k$ in the qualified storage controller 222 are invalidated before the usage control information $UCI_{jTR}$ to $UCI_{kTR}$ for transfer is transmitted.

In operation 10110, the storage device protected information transfer function unit 221 transmits the created encrypted data $E(*Kpu_{[H]}, E(Ks_{[H]m+2}, CDUCIs\|AS))$ to the host device 112.

In the above-described operations 10091.3 to 10091.4, as in the above-described operations 7051.5 to 7051.6 shown in FIG. 7B, the distilled usage control information DUCI is concatenated and then encrypted with $Ks_{[H]m+2}$ and $*Kpu_{[H]}$. However, the individual units of distilled usage control information DUCI may be separately encrypted first and then concatenated. In such a case, it suffices to concatenate the action specifier AS and the transfer transaction identifier TTID only to $DUCI_2$. That is, $E(*Kpu_{[H]}, E(Ks_{[H]m+2},$ $DUCI_2\|AS\|TTID))\|E(*Kpu_{[H]}, E(Ks_{[H]m+2}, DUCI_3))\| \ldots \|$
$E(*Kpu_{[H]}, E(Ks_{[H]m+2}, DUCI_N))$ is created.

In operation 10101, (1) the host device protected information transfer function unit 104 decrypts the received encrypted data $E(*Kpu_{[H]}, E(Ks_{[H]m+2}, CDUCIs\|AS\|TTID))$ with $*Kpr_{[H]}$ and $Ks_{[H]m+2}$ retained in the device itself. (2) Next, integrity of the resulting CDUCIs∥AS∥TTID is confirmed. Then, the storage device specifier SDS is specified from the session key $Ks_{[H]m+2}$ and the received transfer transaction identifier TTID.

(3) Next, the playback function unit 103 specifies the information output control specifier IOCS used in this transfer transaction with the storage device specifier SDS. Next, the playback function unit 103 collates the received concatenated distilled usage control information CDUCIs with this information output control specifier IOCS and confirms whether the concatenated distilled usage control information CDUCIs is adapted to the purpose or not. When integrity is confirmed, the usage control information UCI is created from each unit of distilled usage control information DUCI based on the information output control specifier IOCS. The creation of the usage control information UCI is similar to the foregoing method and is subsequently described in detail. In addition, in this transfer transaction, if the usage control information identifier UCIID and the content identifier CID are dynamically created, the reference values RV for these are updated to the values of the usage control information identifier UCIID and the content identifier CID of the last received usage control information $UCI_{kTR}$. (4) Next, the playback function unit 103 executes a predetermined operation according to the action specifier AS.

The creation of the usage control information UCI from the distilled usage control information DUCT is carried out specifically as follows. The playback function unit 103 retains the information concerning the information included in the first usage control information $UCI_{1TR}$ for transfer, as a reference value RV, based on the output information specifier OIS included in the information output control specifier IOCS. Therefore, the playback function unit 103 restores the usage control information $UCI_1$ to $UCI_N$ from the individual units of distilled usage control information DUCI based on this reference value RV.

For example, if the corresponding service type specifier CSTS is omitted from the concatenated distilled usage control information CDUCIs, the corresponding service type specifier CSTS included in the first usage control information UCI1 is retained as a reference value RV. Therefore, this reference value RV is added to each distilled usage control information DUCI and the usage control information $UCI_2$ to $UCI_N$ is restored. Also, the same applies to the case where the usage rule enforced in storage security manager URS and the usage rule enforced in playback function unit URP are omitted from the concatenated distilled usage control information CDUCIs.

Also, if the usage control information identifier UCIID is omitted from the concatenated distilled usage control information CDUCIs, the usage control information identifier UCIID included in the first usage control information UCI1 is retained as a reference value RV. Therefore, as a value according to the rule of change is sequentially added to this reference value RV, the value that is to be added to each distilled usage control information DUCI is calculated and the usage control information $UCI_2$ to $UCI_N$ are thus restored. Also, the same applies to the case where the content identifier CID is omitted from the concatenated distilled usage control information CDUCIs. These are specified by the start UCIID, the end UCIID, the UCIID increment width specifier, the start CID, the end CID and the CID increment width specifier.

For example, in the case where the usage control information identifier UCIID is omitted, the following is assumed:

the value of the usage control information identifier UCIID of the distilled usage control information $DUCI_2$=the value of the reference value RV, which is the value of the usage control information identifier UCIID of the usage control information $UCI_1$, +the value of the UCIID increment width specifier UCIIDIWS;

the value of the usage control information identifier UCIID of the distilled usage control information $DUCI_3$=the value of the reference value RV+2×the value of the UCIID increment width specifier UCIIDIWS;

the value of the usage control information identifier UCIID of the distilled usage control information $DUCI_N$=the value of the reference value RV+(N−1)×the value of the UCIID increment width specifier UCIIDIWS.

In addition, all the values of the information retention control specifier IRCS retained in the playback function unit 103 and the qualified storage controller 222 are invalidated once a power supply of the entire device is temporarily interrupted, or alternatively, authentication is executed again. Thus, even in the case where transfer transaction is identified by the same transfer transaction identifier TTID, association with previously executed transfer transactions may be broken off.

According to this above-described embodiment of the present invention, distilled usage control information $DUCI_2$ to $DUCI_N$ from which information having a predetermined relation is omitted is created from N−1 units of usage control information $UCI_2$ to $UCI_N$ that are left after excluding the first usage control information $UCI_1$ of N units of usage control information; and, these are used for transfer transaction. Therefore, the volume of information that is to be encrypted, or decrypted, and transferred may be decreased; and, the processing load on the host device 112 and the storage device 240 may be reduced.

In addition, in the above-described embodiment of the present invention, batched transfer transaction is carried out with respect to the N−1 units of usage control information $UCI_2$ to $UCI_N$ that are left after excluding the first usage control information $UCI_1$ of the N units of usage control information, in the above-described operations 10091 and 10110. However, instead of being limited to this, the transfer may be divided into a plurality of times.

Moreover, a plurality of sequences of usage control information groups, for example, a usage control information group $UCI_{1a}$ to $UCI_{Na}$ and a usage control information group $UCI_{1b}$ to $UCI_{Mb}$ may be transferred in a mixed manner. For example, after the above-described operations 10000 to 10061 are carried out with respect to the usage control information $UCI_{1a}$, the above-described operations 10000 to 10061 are carried out with respect to the usage control information $UCI_{1b}$. After that, after the above-described operations 10070 to 10101 are carried out with respect to the usage control information $UCI_{2a}$ to $UCI_{Na}$, the above-described operations 10070 to 10101 are carried out with respect to the usage control information $UCI_{2b}$ to $UCI_{Nb}$. Since these plurality of sequences of usage control information groups are identified by transfer transaction identifiers TTID, such transfer transaction is possible. A second example of transfer transaction is next described.

Figure 13A:
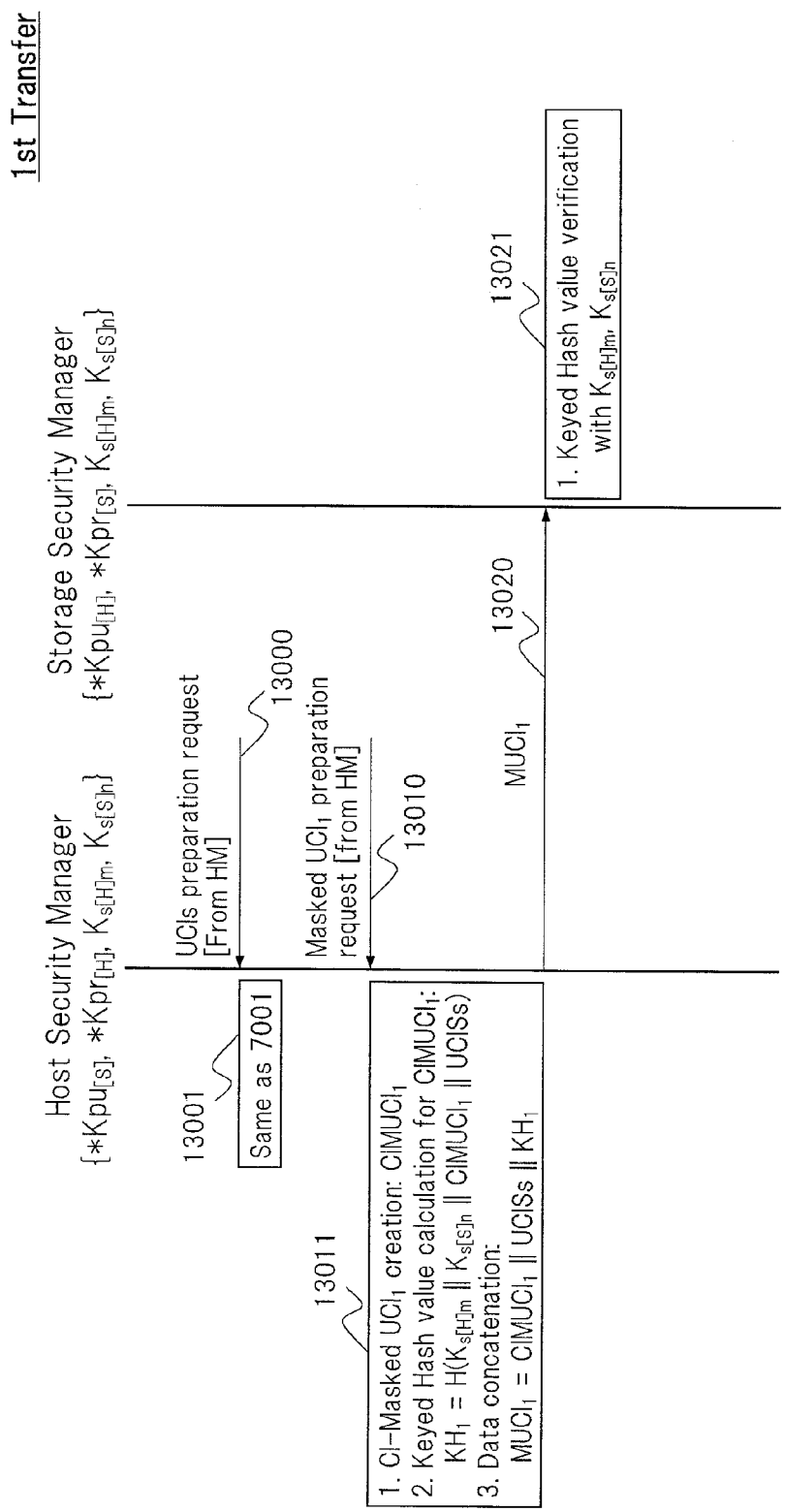
FIG. 13A is a flowchart showing a second example of transfer of usage control information from a content recorder/player to a detachable storage device
Figure 13B:
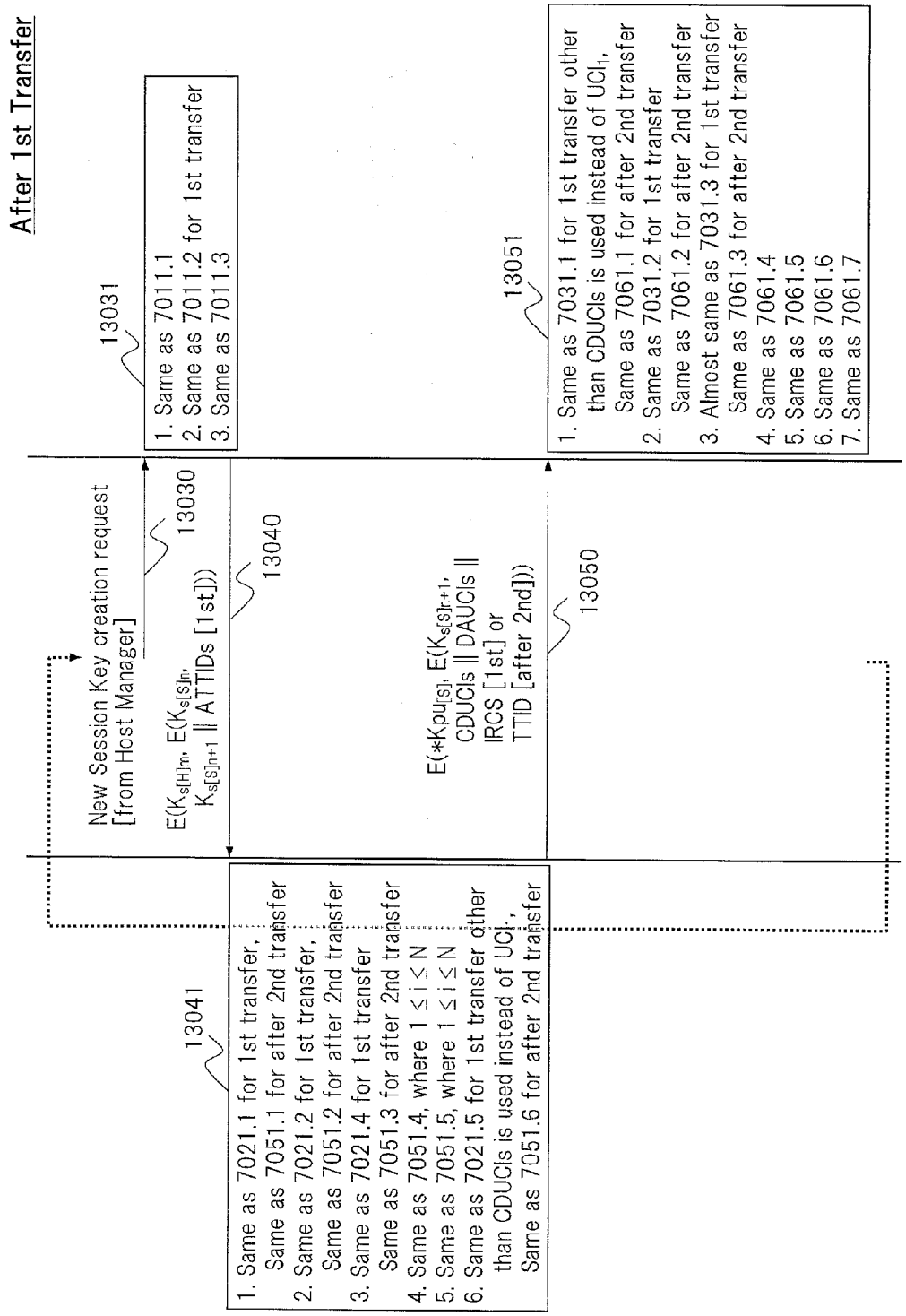
FIG. 13B is a flowchart showing the continuation of the second example, in accordance with an embodiment of the present invention.

Second Example of Transfer Transaction of Usage Control Information from Host Device to Storage Device With reference now to FIGS. 13A and 13B, in accordance with embodiments of the present invention, a flowchart is shown that illustrates the second example of transfer transaction of usage control information from the host device 112 to the storage device 240. The system configuration, the encryption operation method and authentication or similar operations of this example are similar to those of the above-described first example. In addition, the configuration and operations that duplicate those of the first example are denoted by the same reference numerals, and, as such, are not further described in detail.

With further reference to FIG. 13A, in accordance with embodiments of the present invention, in operation 13000, the host manager 110 requests the host device protected information transfer function unit 104 and the recording function unit 102 to prepare usage control information $UCI_1$ to $UCI_N$ scheduled to be transmitted to the storage device 240. Here, the number of units of usage control information $UCI_1$ to $UCI_N$ scheduled for transmission is N. In operation 13001, the recording function unit 102 executes the same operation as the above-described operation 7001.

In operation 13010, the host manager 110 requests the recording function unit 102 to create masked usage control information $MUCI_1$.

In operation 13011, (1) the recording function unit 102 creates cipher information masked usage control information $CIMUCI_1$ in which all the cipher information CI is replaced by 0 with respect to the first usage control information $UCI_1$ of the usage control information $UCI_1$ to $UCI_N$ scheduled for transmission. This cipher information masked usage control information $CIMUCI_1$ may also be created by deleting the cipher information CI from the usage control information $UCI_1$. (2) Next, the host device protected information transfer function unit 104 creates data concatenating the latest two shared session keys $Ks_{[H]m}$ and $Ks_{[S]n}$, the created cipher information masked usage control information $CIMUCI_1$ and the usage control information storage status UCISs; and, the host device protected information transfer function unit 104 calculates a keyed hash value for this data. (3) Next, the host device protected information transfer function unit 104 concatenates the cipher information masked usage control information $CIMUCI_1$, the usage control information storage status UCISs and the acquired hash value to create the masked usage control information $MUCI_1$.

With further reference to FIG. 13B, in accordance with embodiments of the present invention, in operation 13020, the host device protected information transfer function unit 104 transmits the created masked usage control information $MUCI_1$ to the storage device 240.

In operation 13021, the storage device protected information transfer function unit 221 verifies the keyed hash value included in the received masked usage control information $MUCI_1$, and confirms whether the cipher information masked usage control information $CIMUCI_1$ and the usage control information storage status UCISs are not falsified. If it is confirmed that the information is falsified, the execution of this transfer transaction is suspended.

In operation 13030, after the storage security manager 225 completes the execution of the above-described operation 13021, the host manager 110 transmits a new session key creation request to the storage device protected information transfer function unit 221.

In operations 13031.1-3, the storage security manager 225 carries out an operation similar to the above-described operations 7011.1-3. In addition, in operation 13031.2, if transfer of distilled usage control information DUCI is executed a plurality of times on the assumption that the same reference value RV is used, creation of an available transfer transaction identifier group ATTIDs is executed in the first transfer. Also, in operation 13031.3, if an available transfer transaction identifier group ATTIDs is not created, the session key $Ks_{[S]n+1}$ created in operation 13031.1 is encrypted by $Ks_{[S]n}$ and $Ks_{[H]m}$.

In operation 13040, the storage device protected information transfer function unit 221 transmits the created encrypted data $E(Ks_{[H]m},E(Ks_{[S]n},Ks_{[S]n+1}\|ATTIDs$ (in the first transfer))) to the host device 112.

As the encrypted data $E(Ks_{[H]m},E(Ks_{[S]n},Ks_{[S]n+1}\|ATTIDs$ (in the first transfer))) is received, the host security manager 111 executes operation 13041 and 13050.

Specifically, operations 13041.1, 2, 3 and 6 in the first transfer are the same as the above-described operations 7021.1, 2, 4 and 5. However, in operation 13041.6 in the first transfer, concatenated distilled usage control information CDUCIs is used instead of the usage control information $UCI_1$. Thus, in 13050 in the first transfer, encrypted data $E(*Kpu_{[S]},E(Ks_{[S]n+1},CDUCIs\|DAUCI_1\|IRCS))$ is transferred to the storage device 240.

Meanwhile, operations 13041.1-6 in the second and subsequent transfer are the same as the above-described operations 7051.1-6. However, in operation 13041.6 in the second and subsequent transfer, the number of units of usage control information UCI as the base of distilled usage control information DUCI is N, which is associated with usage control information $UCI_1$ to $UCI_N$. Thus, in 13050 in the second and subsequent transfer, encrypted data $E(*Kpu_{[S]},E(Ks_{[S]n+1},CDUCIs\|DAUCI_1\|TTID))$ is transferred to the storage device 240.

In addition, the information retention control specifier IRCS decided in operation 13041.3 in the first transfer has the same configuration as information output control specifier IOCS shown in FIG. 12. However, it is assumed that the output information specifier OIS is the retained information specifier RIS shown in FIG. 9. The two have the same configuration as described above. By this information retention control specifier IRCS, the storage device 240 is notified of the kind of information to be omitted from the usage control information $UCI_1$ to $UCI_N$ later.

Next, as encrypted data $E(Kpu_{[S]}, E(Ks_{[S]n+1}, CDUCIs\|DAUCIs\|IRCS$ (in the first transfer) or TTID (in the second and subsequent transfer))) is received, the storage security manager 225 executes operation 13051.

Specifically, operations 13051.1-3 in the first transfer are substantially the same as the above-described operations 7031.1, 2 and 3. Here, in operation 7031.3 in the first transfer, the qualified storage controller 222 compares the information included in the masked usage control information $MUCI_1$ received in the above-described operation 13020 with the value of the usage control information identifier UCIID acquired in operation 13051.2. If there is any discrepancy between these, the storage security manager 225 suspends this transfer transaction. Also, the qualified storage controller 222 retains information concerned of the information included in masked usage control information $MUCI_1$, as a reference value RV, based on the retained information specifier RIS of the information retention control specifier IRCS with a similar method to the above-described operation 7031.3.

On the other hand, operations 13051.1-7 in the second and subsequent transfer are the same as the above-described operations 7061.1-7.

Figure 14A:
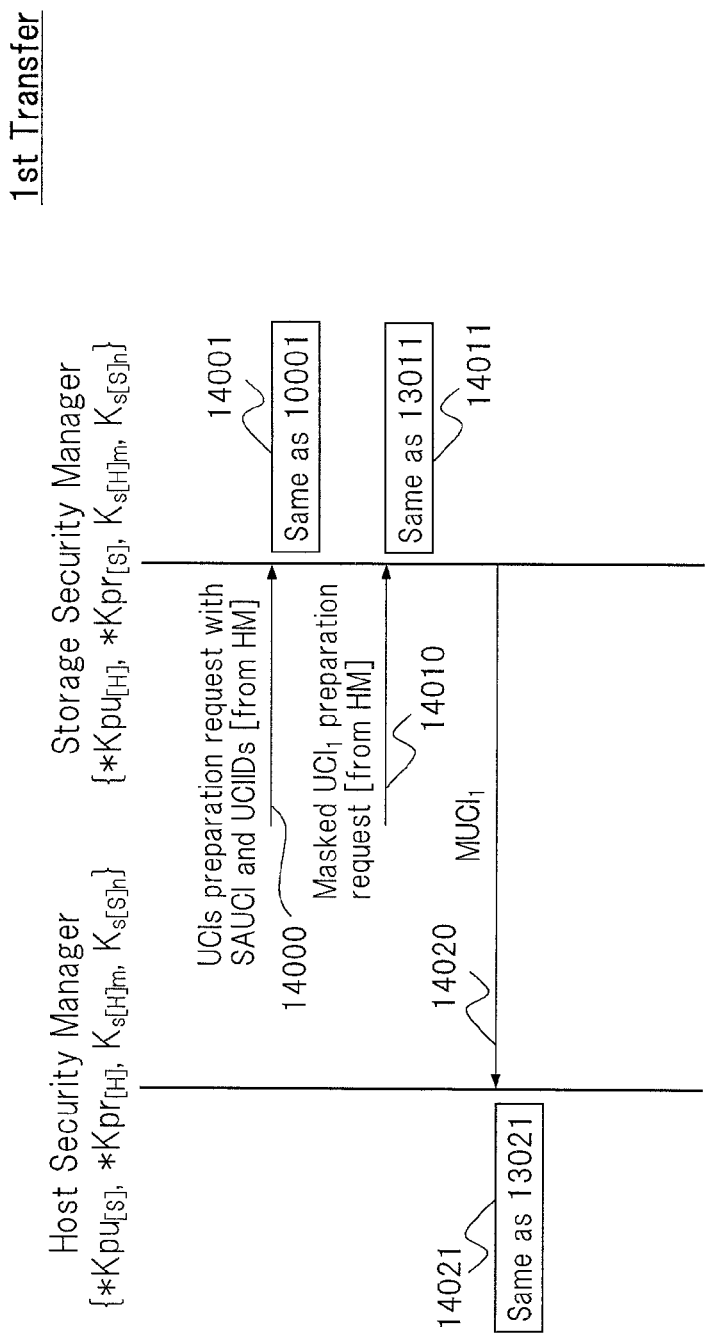
FIG. 14A is a flowchart showing a second example of transfer of usage control information from a detachable storage device to a content recorder/player, in accordance with an embodiment of the present invention.
Figure 14B:
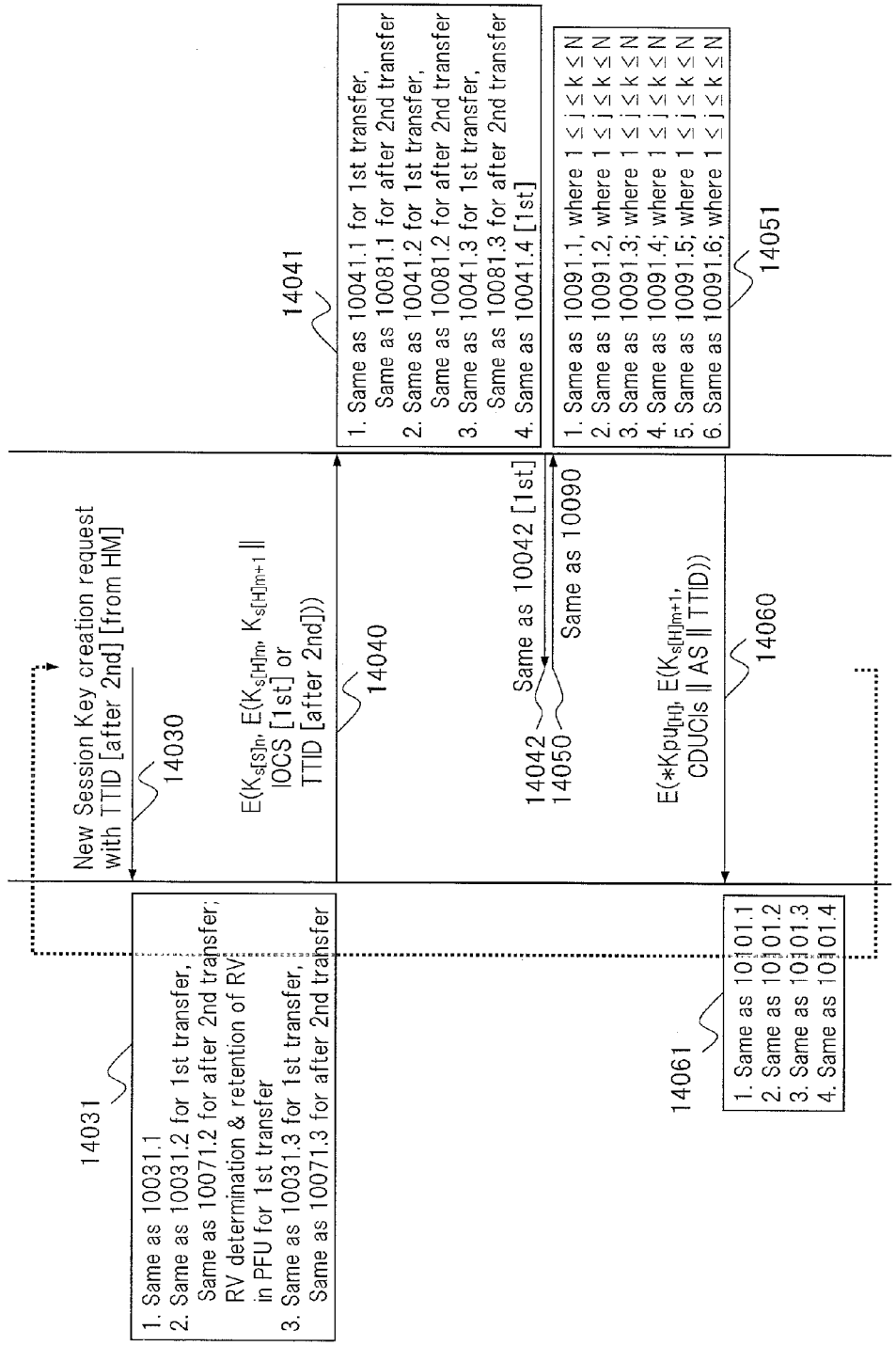
FIG. 14B is a flowchart showing the continuation of the second example, in accordance with an embodiment of the present invention.

Second Example of Transfer Transaction of Usage Control Information from Storage Device to Host Device With reference now to FIGS. 14A and 14B, in accordance with embodiments of the present invention, a flowchart is shown that illustrates a second example of transfer transaction of usage control information from the storage device 240 to the host device 112.

With further reference to FIG. 14A, in accordance with embodiments of the present invention, in operation 14000, the host manager 110 requests the storage device protected information transfer function unit 221 and the qualified storage controller 222 to prepare usage control information $UCI_1$ to $UCI_N$ scheduled to be transmitted to the host device 112. Here, the number of units of usage control information $UCI_1$ to $UCI_N$ scheduled for transmission is N.

In operation 14001, the qualified storage controller 222 executes the same operation as the above-described operation 10001. Here, also the method of deciding usage control information storage status UCISs is the same.

In operation 14010, the host manager 110 requests the storage device protected information transfer function unit 221 to create masked usage control information $MUCI_1$, which is masked $UCI_1$.

In operation 14011, the storage security manager 225 executes the same operation as the above-described operation 13011. However, the agent of this operation 14011 is the qualified storage controller 222 and the storage device protected information transfer function unit 221, unlike the above-described operation 13011. Then, in 14020, the storage device protected information transfer function unit 221 transmits the created masked usage control information $MUCI_1$ to the host device 112.

In operation 14021, the storage device protected information transfer function unit 221 executes the same operation as the above-described operation 13021.

With further reference to FIG. 14B, in accordance with embodiments of the present invention, in operation 14030, after the host security manager 111 completes the execution of the above-described operation 14021, the host manager 110 transmits a new session key creation request to the host device protected information transfer function unit 104. However, in the second and subsequent transfer, the transfer transaction identifier TTID decided in the first transfer is designated.

As the request of operation 14030 is received, the host security manager 111 executes operation 14031. Specifically, operations 14031.1-3 in the first transfer are the same as the above-described operations 10031.1-3. However, in operation 14031.2 in the first transfer, the playback function unit 103 decides an information output control specifier IOCS and extracts and retains information to be a reference value RV from the masked usage control information $MUCI_1$ based on this information output control specifier IOCS. Thus, in operation 14040 in the first transfer, encrypted data $E(Ks_{[S]n}, E(Ks_{[H]m}, Ks_{[H]m+1} \| IOCS))$ is transferred to the storage device 240.

Meanwhile, in operation 14031.2 in the second and subsequent transfer, the transfer transaction identifier TTID designated from the host manager 110 is set as a transfer transaction identifier TTID to be transmitted. Thus, in operation 14040 in the second and subsequent transfer, encrypted data $E(Ks_{[S]n}, E(Ks_{[H]m}, Ks_{[H]m+1} \| TTID))$ is transferred to the storage device 240.

Next, when the encrypted data $E(Ks_{[S]n}, E(Ks_{[H]m}, Ks_{[H]m+1} \| IOCS$ (in the first transfer) or TTID (in the second and subsequent transfer))) is received, the storage security manager 225 executes operation 14041. Specifically, operations 14041.1-4 in the first transfer and operations 14041.1-3 in the second and subsequent transfer are the same as the above-described operations 10081.1-4.

Also, in the first transfer, in 14042, the storage device protected information transfer function unit 221 notifies the host manager 110 of the decided transfer transaction identifier TTID, as in the above-described operation 10042. Moreover, in 14050, the host manager 110 issues the same command as in the above-described operation 10090.

Next, when the command in operation 14050 is received, the storage security manager 225 executes operation 14051 and 14050. Here, operation 14051 is the same as the above-described operation 10091 except that the numbers of usage control information UCI as the base of distilled usage control information DUCT range from 1 to N. Also, operation 14060 is the same as the above-described operation 10110. Then, when encrypted data $E(*Kpu_{[H]}, E(Ks_{[H]m+1}, CDUCIs\|AS\|TTID))$ is received, the host security manager 111 executes operation 14061. This operation 14061 is the same as the above-described operation 10101.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A data transfer system that is configured to transfer a plurality of information groups comprising a plurality of kinds of information corresponding to content data from a first device to a second device, said data transfer system comprising:

said first device, said first device configured to encrypt a partial information group of said plurality of information groups and configured to transfer an encrypted information group to said second device, said first device configured to generate an omission information group with information having a predetermined relation omitted from at least remaining information groups of said plurality of information groups, and said first device configured to encrypt and configured to transfer said omission information group to said second device, when a partial kind of information of said plurality of information groups has said predetermined relation; and said second device, said second device configured to decrypt said partial information group and said omission information group, and said second device configured to restore omitted information based on said omitted information having said predetermined relation comprised in a transferred partial information group and configured to add said restored omitted information to said transferred omission information group.

2. The data transfer system according to claim 1, wherein each of said information having said predetermined relation represents same content, and said second device is configured to add same information as said information having said predetermined relation comprised in said transferred partial information group to said omission information group.

3. The data transfer system according to claim 1, wherein said information having said predetermined relation represents a variable that changes according to a predetermined rule, and said second device is configured to restore said omitted information based on said variable represented by said information having said predetermined relation comprised in said transferred partial information group and said predetermined rule.

4. The data transfer system according to claim 1, wherein said first device is configured to transfer a first information group of said plurality of information groups to said second device, is configured to generate said omission information group with respect to subsequent information groups and is configured to transfer said omission information group to said second device.

5. The data transfer system according to claim 4, wherein said first device is configured to transfer collectively a plurality of omission information groups to said second device.

6. The data transfer system according to claim 1, wherein said first device is configured to notify said second device of said kind of said omitted information.

7. The data transfer system according to claim 6, wherein said second device is configured to stop transfer when said kind of said information omitted in said transferred omission information groups is different from said kind of which said second device is notified.

8. The data transfer system according to claim 7, wherein said second device is configured to notify said first device of said kind that is different.

9. The data transfer system according to claim 1, wherein said plurality of information groups that are to be transferred from said second device and said kind of said information that are to be omitted in said plurality of information groups from said second device are designated to said first device.

10. The data transfer system according to claim 9, wherein said first device comprises a temporary storage unit that is configured to store temporarily said plurality of information groups that are to be transferred, and said first device is configured to stop transfer when said kind of said information having said predetermined relation in said plurality of information groups stored in said temporary storage unit is different from designated said kind.

11. The data transfer system according to claim 10, wherein said first device is configured to notify said second device of said kind that is different.

12. The data transfer system according to claim 1, wherein said first device is configured to generate said omission information group from said plurality of information groups.

13. The data transfer system according to claim 1, wherein said first device is configured to add a keyed hash value of said partial information group to said partial information group, and said second device is configured to confirm validity of said partial information group based on said keyed hash value.

14. A data transfer method for transferring a plurality of information groups comprising a plurality of kinds of information corresponding to content data from a first device to a second device, said data transfer method comprising:
encrypting and transferring with said first device, when a partial kind of said information of said plurality of information groups has a predetermined relation, a partial information group of said plurality of information groups to said second device, and generating with said first device, when a partial kind of said information of said plurality of information groups has said predetermined relation, an omission information group with information having said predetermined relation omitted from at least remaining information groups of said plurality of information groups, and encrypting and transferring with said first device, when a partial kind of said information of said plurality of information groups has said predetermined relation, said omission information group to said second device; and decrypting with said second device said partial information group and said omission information group, and restoring with said omitted information croup based on said information having said predetermined relation comprised in said transferred partial information group and adding with said second device said restored omitted information to said transferred partial information group.

15. A data transmission device that is configured to transmit a plurality of information groups comprising a plurality of kinds of information corresponding to content data to a data receiving device, said data transmission device comprising:
an encryptor that is configured to encrypt a partial information group of said plurality of information groups;
a transmitter that is configured to transfer an encrypted information group to said data receiving device; and
a generator that is configured to generate an omission information group with information having a predetermined relation omitted from at least remaining information groups of said plurality of information groups;
wherein said encryptor is configured to encrypt said omission information group, and said transmitter is configured to transfer said omission information group to said data receiving device,
when a partial kind of said information of said plurality of information groups has said predetermined relation.

16. A data receiving device that is configured to receive a plurality of information groups comprising a plurality of kinds of information corresponding to content data from a data transmission device, said data receiving device comprising:
a receiver that is configured to receive a partial information group of said plurality of information groups and an omission information group with information having a predetermined relation omitted from at least remaining information groups of said plurality of information groups, in an encrypted state from said data transmission device;
a decryptor that is configured to decrypt said partial information group and said omission information group; and
a restorer that is configured to restore omitted information based on information having said predetermined relation comprised in a transferred partial information group and is configured to add said restored omitted information to a transferred omission information group,
when a partial kind of said information of said plurality of information groups has said predetermined relation.

* * * * *

UNITED STATES PATENT AND TRADEMARK OFFICE
CERTIFICATE OF CORRECTION

PATENT NO. : 8,345,868 B2
APPLICATION NO. : 12/613459
DATED : January 1, 2013
INVENTOR(S) : Tatsuya Hirai and Atsushi Saito It is certified that error appears in the above-identified patent and that said Letters Patent is hereby corrected as shown below:

In the Claims:

Column 32, Claim 14, Line 13: Delete "croup"
                                       Insert --group--

Signed and Sealed this
Eighteenth Day of June, 2013

Teresa Stanek Rea
*Acting Director of the United States Patent and Trademark Office*